# United States Patent
Licht et al.

(10) Patent No.: US 12,486,438 B2
(45) Date of Patent: *Dec. 2, 2025

(54) ADHESIVE METHOD USING TWO-COMPONENT ADHESIVES BASED ON COMPOUNDS HAVING CYCLOTHIOCARBONATE UNITS

(71) Applicant: BASF SE, Ludwigshafen am Rhein (DE)

(72) Inventors: Ulrike Licht, Ludwigshafen am Rhein (DE); Peter Rudolf, Ludwigshafen am Rhein (DE); Markus Jegelka, Ludwigshafen am Rhein (DE); Indre Thiel, Ludwigshafen am Rhein (DE); Karl-Heinz Schumacher, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 695 days.

This patent is subject to a terminal disclaimer.

(21) Appl. No.: 17/257,749

(22) PCT Filed: Jun. 24, 2019

(86) PCT No.: PCT/EP2019/066687
§ 371 (c)(1),
(2) Date: Jan. 4, 2021

(87) PCT Pub. No.: WO2020/007634
PCT Pub. Date: Jan. 9, 2020

(65) Prior Publication Data
US 2021/0171811 A1    Jun. 10, 2021

(30) Foreign Application Priority Data

Jul. 4, 2018   (EP) .................................... 18181676

(51) Int. Cl.
| | |
|---|---|
| C09J 175/04 | (2006.01) |
| B32B 7/12 | (2006.01) |
| B32B 15/04 | (2006.01) |
| B32B 15/18 | (2006.01) |
| B32B 15/20 | (2006.01) |
| B32B 21/04 | (2006.01) |
| B32B 27/08 | (2006.01) |
| B32B 27/36 | (2006.01) |
| B32B 37/12 | (2006.01) |
| C07D 327/04 | (2006.01) |
| C08G 71/04 | (2006.01) |
| C09J 181/02 | (2006.01) |
| C09J 181/04 | (2006.01) |

(52) U.S. Cl.
CPC .............. *C09J 175/04* (2013.01); *B32B 7/12* (2013.01); *B32B 15/043* (2013.01); *B32B 15/20* (2013.01); *B32B 27/08* (2013.01); *B32B 27/36* (2013.01); *B32B 37/12* (2013.01); *C07D 327/04* (2013.01); *C08G 71/04* (2013.01); *C09J 181/02* (2013.01); *C09J 181/04* (2013.01); *B32B 15/18* (2013.01); *B32B 21/042* (2013.01); *B32B 2037/1253* (2013.01); *B32B 2311/24* (2013.01); *B32B 2311/30* (2013.01); *B32B 2317/16* (2013.01); *B32B 2367/00* (2013.01)

(58) Field of Classification Search
CPC ...... C09J 175/04; C09J 181/02; C09J 181/04; B32B 7/12; B32B 15/043; B32B 15/20; B32B 27/08; B32B 27/36; B32B 37/12; B32B 15/18; B32B 21/042; B32B 2037/1253; B32B 2311/24; B32B 2311/30; B32B 2317/16; B32B 2367/00; C07D 327/04; C08G 71/04
See application file for complete search history.

(56) References Cited

U.S. PATENT DOCUMENTS

| | | |
|---|---|---|
| 2,828,318 A | 3/1958 | Reynolds |
| 3,072,676 A | 1/1963 | Lynn et al. |
| 3,201,416 A | 8/1965 | Lynn et al. |
| 3,232,936 A | 2/1966 | Reynolds |
| 3,349,100 A | 10/1967 | Villa |
| 3,517,029 A | 6/1970 | Johnson |

(Continued)

FOREIGN PATENT DOCUMENTS

| | | |
|---|---|---|
| EP | 0 279 303 | 8/1988 |
| EP | 0943660 A1 | 9/1999 |

(Continued)

OTHER PUBLICATIONS

WO2012085120A2 Machine Translation of Description (EPO/Google) (Year: 2023).*
U.S. Office Action dated May 31, 2023, in U.S. Appl. No. 16/639,339, 17 pages.
International Preliminary Report on Patentability received for PCT Patent Application No. PCT/EP2019/066687, mailed on Jan. 14, 2021, 12 pages. (6 pages of English Translation and 6 pages of Original Document).
International Search Report and Written Opinion received for PCT Patent Application No. PCT/EP2019/066687, mailed on Sep. 18, 2019, 16 pages. (7 pages of English Translation and 9 pages of Original Document).

(Continued)

*Primary Examiner* — Cynthia L Schaller
(74) *Attorney, Agent, or Firm* — Grüneberg and Myers PLLC

(57) ABSTRACT

A bonding process is described in which two substrates are bonded together by applying to the surface of at least one of the substrates a curable, not yet cured 2-component adhesive that comprises, in a first component, a compound A having at least one defined cyclic thiocarbonate unit having a five-membered ring structure and, in a second component, a curing compound B selected from compounds having at least one functional group selected from primary amine groups and secondary amine groups.

23 Claims, No Drawings

(56) References Cited

U.S. PATENT DOCUMENTS

| | | | |
|---|---|---|---|
| 6,160,044 A * | 12/2000 | Jimbo | C07D 327/04 |
| | | | 524/394 |
| 6,221,545 B1 * | 4/2001 | Tran | B32B 7/12 |
| | | | 430/10 |
| 6,372,871 B1 | 4/2002 | Jimbo et al. | |
| 10,889,559 B2 | 1/2021 | Rudolf et al. | |
| 11,247,979 B2 | 2/2022 | Rudolf et al. | |
| 11,365,289 B2 | 6/2022 | Thiel et al. | |
| 11,384,207 B2 | 7/2022 | Thiel et al. | |
| 11,780,964 B2 | 10/2023 | Rudolf et al. | |
| 11,958,823 B2 | 4/2024 | Rudolf et al. | |
| 12,060,458 B2 | 8/2024 | Thiel et al. | |
| 2015/0247004 A1 | 9/2015 | Lombardo et al. | |
| 2016/0122473 A1 | 5/2016 | Monnier et al. | |
| 2016/0206520 A1 | 7/2016 | Fornof et al. | |
| 2018/0236757 A1 * | 8/2018 | Nangou | B32B 9/045 |
| 2020/0239633 A1 | 7/2020 | Rudolf et al. | |
| 2020/0299255 A1 | 9/2020 | Rudolf et al. | |
| 2020/0354333 A1 | 11/2020 | Rudolf et al. | |
| 2020/0369641 A1 | 11/2020 | Rudolf et al. | |
| 2021/0395454 A1 | 12/2021 | Thiel et al. | |
| 2022/0127241 A1 | 4/2022 | Rudolf et al. | |
| 2024/0279199 A1 | 8/2024 | Rudolf et al. | |

FOREIGN PATENT DOCUMENTS

| | | |
|---|---|---|
| EP | 1 334 965 | 8/2003 |
| EP | 1 506 964 | 2/2005 |
| EP | 2 468 791 | 6/2012 |
| JP | H04-264075 | 9/1992 |
| JP | H07-62190 A | 3/1995 |
| JP | 2007-178903 | 7/2007 |
| WO | 2006/005386 A1 | 1/2006 |
| WO | 2011/157671 | 12/2011 |
| WO | 2012/085120 A2 | 6/2012 |
| WO | 2013/144299 | 10/2013 |
| WO | 2014/188116 | 11/2014 |
| WO | 2016/185106 A1 | 11/2016 |
| WO | 2016/202652 A1 | 12/2016 |
| WO | 2017/207461 A1 | 12/2017 |
| WO | 2018/054713 A1 | 3/2018 |
| WO | 2019/034468 A1 | 2/2019 |
| WO | 2019/034469 A1 | 2/2019 |
| WO | 2019/034470 A1 | 2/2019 |
| WO | 2019/034473 A1 | 2/2019 |

OTHER PUBLICATIONS

Luo, et al., "Synthesis of cyclic monothiocarbonates via the coupling reaction of carbonyl sulfide (COS) with epoxides", Catalysis Science & Technology, vol. 6, Issue 1, Aug. 17, 2015, pp. 188-192.
U.S. Office Action dated Feb. 27, 2023, in U.S. Appl. No. 16/639,204, 15 pages.
Libretexts Chemistry, "Aliphatic hydrocarbons," pp. 1-17, (2023). https://chem.libretexts.org/Bookshelves/Introductory_Chemistry/Chemistry_for_Changing_Times_(Hill_and_McCreary)/09%3A_Organic_Chemistry/9.02%3A_Aliphatic_Hydrocarbons, (Year 2023).
Bingham et al., "Thiocarbonyl chemistry in polymer science", Polymer Chemistry, vol. 13, May 4, 2022, pp. 2880-2901.
Calo et al., "Cyclic Carbonate Formation from Carbon Dioxide and Oxiranes in Tetrabutylammonium Halides as Solvents and Catalysts", Organic Letters, vol. 4, No. 15, Jun. 29, 2002, pp. 2561-2563.
Etlis et al., "Reaction of Chloro Derivatives of Alkene Thiocarbonates with Ammonia and Amines", Doklady Akademii Nauk SSSR, vol. 142, No. 4, 1962, with English translation, 7 pages.
Fan et al., "Adaptable Strategy to Fabricate Self-Healable and Reprocessable Poly(thiourethane-urethane) Elastomers via Reversible Thiol-Isocyanate Click Chemistry", Macromolecules, vol. 53, May 28, 2020, pp. 4284-4293.
Richard C. Forster et al., "Dithiols. Part 28 Conversion of 1,3-Dithiolan-2-Ones, 1,3-Oxathiolan-2-Ones, and 1,3-Oxathiolan-2-thiones into 1,3-Dithiolan-2-thiones", Journal of the Chemical Society. Perkin I, Transactions 1, Issue 8, XP055518366, Jan. 1, 1978, pp. 822-829.
Friederichs et al., "Determination of Dithiocarbamate residues in Dietetic Foods (e.g. Ready-to-Eat Baby Food)", Application GC-6, SCA-180-006, Shimadzu Europa GmbH, Mar. 1993, 4 pages.
Goethals et al., "Diversely Substituted Polyamide Structures through Thiol-Ene Polymerization of Renewable Thiolactone Building Blocks", Macromolecules, vol. 47, Jan. 14, 2014, pp. 61-69.
International Preliminary Report on Patentability and Written Opinion of the International Searching Authority issued on Feb. 18, 2020 in PCT/EP2018/071335 filed Aug. 7, 2018, 8 pages.
International Search Report issued on Nov. 6, 2018 in PCT/EP2018/071343, 3 pages.
International Search Report issued on Nov. 6, 2018 in PCT/EP2018/071335, 4 pages.
Jerry March, "Advanced Organic Chemistry, Reactions, Mechanisms, And Structure", Fourth Edition, 1992, pp. 766-767.
Kihara et al., "Catalytic Activity of Various Salts in the Reaction of 2,3-Epoxypropyl Phenyl Ether and Carbon Dioxide under Atmospheric Pressure", J. Org. Chem., vol. 58, No. 23, Nov. 1, 1993, pp. 6198-6202.
Kihara et al., "Preparation of 1,3-Oxathiolane-2-thiones by the Reaction of Oxirane and Carbon Disulfide", Journal of Organic Chemistry, vol. 60, No. 2, Jan. 1, 1995, pp. 473-475.
Kulshrestha et al., "Cyclic Dithiocarbonates: Novel in Situ Gelling Biomaterials" American Chemical Society, 2009, 1 page.
Kulshrestha et al., "Cyclic dithiocarbonates: novel in situ gelling biomaterials", PMSE Preprints, 2009, 2 pages. ISSN:1550-6703.
Levinn et al., "Development and Application of Carbonyl Sulfide-Based Donors for $H_2S$ Delivery", Accounts of Chemical Research, vol. 52, Aug. 7, 2019, pp. 2723-2731.
Pen-Chung Wang, "A new synthesis of 2-Oxathiolone", Heterocycles, vol. 24, No. 2, 1986, pp. 329-330.
Rangelov et al., "Towards the synthesis of amino-substituted epoxides: synthesis and characterization of glycidyldidodecylamine", Designed Monomers and Polymers, vol. 4, No. 1, (2001), published online Apr. 2, 2012, pp. 39-43.
Reynolds et al., "Mercaptoethylation. II. Preparation of 2-Mercaptoethyl Carbamates and Oligoethylene Sulfides", Journal of Organic Chemistry, vol. 26, Issue 12, Dec. 1961, pp. 5111-5115.
Taguchi et al., "The Synthesis of 1,3-Dithiolon-2-ones on the Reaction of Oxiranes with Carbon Disulfide under High Pressure", Bull. Chem. Soc, Jpn., vol. 62, No. 2, Feb. 1989, pp. 474-478.
Tomita et al., "Polyaddition of Bis(cyclic thiocarbonate) with Diamines. Novel Efficient Synthetic Method of Polyhydroxythiourethanes", Macromolecules, vol. 34, Jan. 20, 2001, pp. 727-733.
U.S. Office Action dated Jan. 23, 2024, in U.S. Appl. No. 17/646,766, 17 pages.
U.S. Office Action dated Jul. 20, 2023, in U.S. Appl. No. 17/646,766, 19 pages.
U.S. Office Action dated Mar. 12, 2024, in U.S. Appl. No. 17/309,199, 10 pages.
Wang et al., "Cooperative Catalysis with binary Lewis acid-Lewis base system for the coupling of carbon disulfide and epoxides", Applied Organometallic Chemistry, vol. 26, Issue 11, Sep. 20, 2012, pp. 614-618.
Zhao et al., "Kinetic Insights into Hydrogen Sulfide ($H_2S$) Delivery from Caged-Carbonyl Sulfide (COS) Isomeric Donor Platforms", J. Am. Chem. Soc., vol. 139, No. 45, Nov. 15, 2017, pp. 1-30.
U.S. Appl. No. 17/309,199, filed May 6, 2021, Thiel et al.
U.S. Appl. No. 17/646,766, filed Jan. 3, 2022, Rudolf et al.
U.S. Office Action dated Nov. 1, 2022, in U.S. Appl. No. 16/639,204, 17 pages.
U.S. Appl. No. 16/639,204, filed Feb. 14, 2020, 2020/0239633, Rudolf et at.
U.S. Office Action dated Aug. 31, 2022, in U.S. Appl. No. 16/639,339, 14 pages.
U.S. Appl. No. 16/639,339, filed Feb. 14, 2020, 2020/0354333, Rudolf et al.

(56) References Cited

OTHER PUBLICATIONS

Non-Final Official Action issued in U.S. Appl. No. 18/595,535, on Sep. 28, 2024, 15 pages.
U.S. Appl. No. 18/595,535, filed Mar. 5, 2024, Rudolf et al.

* cited by examiner

ADHESIVE METHOD USING TWO-COMPONENT ADHESIVES BASED ON COMPOUNDS HAVING CYCLOTHIOCARBONATE UNITS

CROSS-REFERENCE TO RELATED APPLICATIONS

This application is a national stage application (under 35 U.S.C. § 371) of PCT/EP2019/066687, filed Jun. 24, 2019, which claims benefit of European Application No. 18181676.0, filed Jul. 4, 2018, both of which are incorporated herein by reference in their entirety.

A bonding process is described that uses a 2-component adhesive based on a compound A having a cyclic thiocarbonate unit and a curing compound B having primary or secondary amine groups.

Often used as adhesives are two-component systems of polyurethanes based on polyisocyanates, in which isocyanate components react with polyol components to form a high-molecular-weight polyurethane polymer. Such systems are applied either as solvent-free and water-free reactive one hundred percent systems or in the form of an adhesive dissolved in an organic solvent. The coating substances are applied onto a first substrate by means of a suitable application system and are then cured, optionally after evaporation of the solvent. The resulting high bonding strengths in combinations of the most diverse film materials are advantageous.

The reactive, monomeric, low-molecular-weight (poly) isocyanate compounds present in conventional two-component adhesives pose a toxicological risk, especially if they are highly volatile or can migrate. This concerns firstly the handling of these adhesives during use, since isocyanates generally have high toxicity and a high allergenic potential. Secondly, in the case of flexible substrates there is the risk that aromatic isocyanate that has not fully reacted will migrate through the substrate and be hydrolyzed there by the water content, resulting in the formation of carcinogenic aromatic amines. What is therefore desired are isocyanate-free two-component systems for curable adhesive compositions having the best possible adhesive values and having good curing properties, if possible even at room temperature and without heating, i.e. cold-curing.

Alternatives to polyurethane-forming isocyanate/alcohol systems are known. For example, cyclic carbonates react with amines to form urethanes and are referred to in the literature also as "NISO" or "NIPU". Two-component systems consisting of amines and unsubstituted cyclic carbonates do not cure at room temperature, but require heating to temperatures of up to 80° C. for curing. Other routes to achieve faster reaction of cyclic carbonates with amines have accordingly already been explored. WO 2018/054713 and WO 2016/202652 describe the use of exo-vinylene cyclic carbonates in adhesives. WO 2017/207461 describes the use of cyclic carbonate amides in adhesives.

Cyclic carbonates with sulfur atoms in the ring are known to cure more rapidly, but their synthesis requires highly toxic and costly starting materials such as $CS_2$. WO 2006/005386 describes curable compositions based inter alia on cyclic thiocarbonates and amines, in which the sulfur in the cyclic thiocarbonate is attached in the form of a C=S group. WO 2016/185106 describes hydrocarbon polymers having two cyclic dithiocarbonate end groups, the cyclic dithiocarbonates containing the group S—C(=S)—O—. WO 2012/085120 describes the use of thiocarbonates in curable epoxy resin formulations.

The preparation of cyclic monothiocarbonates is described in EP17186542.1 and in EP17186545.4. Cured polyurethanes formed from cyclic monothiocarbonates and diamines are described in EP17186543.9 and in EP17186544.7.

It was an object of the present invention to provide an alternative to polyurethane-forming 2-component adhesives based on the reaction with isocyanates. The starting materials should be as safe as possible, easily accessible and highly reactive toward amines, and if possible cure at room temperature without heating and give the best possible adhesive values, for example when used as a laminating adhesive or as a structural adhesive.

It has been found that both the monofunctional cyclic monothiocarbonates described in more detail below and multifunctional cyclic monothiocarbonates (i.e. compounds having more than one cyclic monothiocarbonate group) react with amines at room temperature within 24 h or less to form urethane thiols that in a subsequent further reaction, e.g. with double bonds or with epoxides, can cure further through the formation of polythioethers or disulfides, thus allowing the formulation of two-component adhesives that not only have a favorable open time of minutes to hours, but also result in resilient bonds within just 12 h at room temperature.

The present invention provides a bonding process in which two substrates are bonded together by applying to the surface of at least one of the substrates a curable, not yet cured 2-component adhesive that is preferably fluid or liquid at room temperature, which (a) in a first component comprises at least one compound A having at least one cyclic thiocarbonate unit having a five-membered ring structure in which three members of the five-membered ring have the structure —O—C(=O)—S—, the two remaining members of the five-membered ring being carbon atoms; and (b) in a second component comprises at least one curing compound B selected from compounds having at least one functional group selected from primary amine groups and secondary amine groups, wherein the at least one functional group may also be present in masked, latently reactive form.

In a further step, the substrate coated with the adhesive is brought into contact with a second substrate and the adhesive is cured.

The first component, the second component and/or a further component of the adhesive may optionally comprise at least one compound C that has at least one functional group reactive toward SH groups. The functional group reactive toward SH groups is preferably selected from groups having at least one ethylenically unsaturated bond and epoxy groups; in the case of compounds having epoxy groups, these are present in the first and/or in the further (third) component of the adhesive. Compound A contains one or more cyclic monothiocarbonate groups, hereinafter also abbreviated to monothiocarbonate.

Preferably, at least two of the compounds A, B, and C are polyfunctional. A polyfunctional compound A has two or more cyclic monothiocarbonate groups. A polyfunctional compound B has either two or more functional groups selected from primary amine groups and secondary amine groups, or compound B has at least one functional group selected from primary amine groups and secondary amine groups and at least one group reactive toward SH groups. A polyfunctional compound C has two or more groups reactive toward SH groups.

The expression "curable, not yet cured" means that cyclic thiocarbonate groups in compound A and functional groups in compound B that are reactive therewith are both present and have not yet reacted with one another. Curing is demonstrated, for example, by an increase in zero shear viscosity. The zero shear viscosity of the mixed components at 23° C. before coating the substrates is preferably less than 3000 Pa s, or less than 1500 Pa s, more preferably less than 300 Pa s. The zero shear viscosity of the mixed components at 70° C. before coating the substrates is preferably less than 300 Pa s.

Unless otherwise stated, molecular weights of polymers refer herein to the weight-average molecular weight, measured by gel-permeation chromatography in THF using a polystyrene standard.

Preference is given to a bonding process wherein (a) compound A has a number $n_A$ of cyclic thiocarbonate units, $n_A$ being an integer greater than or equal to 1, preferably 2 to 1000;

(b) compound B has a number $n_B$ of functional groups and a number $n_{C2}$ of ethylenically unsaturated double bonds reactive toward SH groups, $n_B$ being an integer greater than or equal to 1, preferably 2 to 1000, and $n_{C2}$ being an integer greater than or equal to 0; and (c) the first component, the second component and/or a further component optionally comprises at least one compound C that contains a number $n_{C3}$ of functional groups reactive toward SH groups, $n_{C3}$ being an integer greater than or equal to 1, preferably 2 to 1000;

with the proviso that at least one of the numbers $n_A$ and the sum of $n_B+n_{C2}$ is greater than or equal to 2;

and that when $n_{C2}$ is zero, then either $n_{C3}$ is greater than or equal to 2, or both $n_A$ and $n_B$ are greater than or equal to 2, or both $n_A$ and $n_B$ and $n_{C3}$ are greater than or equal to 2.

The monothiocarbonate may contain further heteroatoms, for example oxygen, sulfur, nitrogen, chlorine or silicon, for example in the form of functional groups selected from epoxy groups, ether groups, hydroxy groups, keto groups, aldehyde groups, ester groups, carboxyl groups, thioether groups, thiol groups, tertiary amine groups. The monothiocarbonate preferably has a maximum of one functional group besides the monothiocarbonate group.

Compound A may be a monomer, an oligomer, or a polymer. Compound A may, for example, have up to 1000, or up to 500 or up to 100 five-membered cyclic monothiocarbonate groups. Compound A preferably has 1 to 10 or 1 to 5, more preferably 1, 2 or 3, in particular 1 or 2, five-membered cyclic monothiocarbonate groups.

Compound A may have a molecular weight of e.g. 104 up to 500 000 or up to 100 000 g/mol, e.g. from 104 to 1000 g/mol or from 104 to 500 g/mol. In the case of polymers, this is the weight-average molecular weight, measured by gel-permeation chromatography against a polystyrene standard. The molecular weight is preferably greater than 1000 g/mol.

Compound A preferably has no primary or secondary amino groups. Compound A preferably has no other functional groups aside from monothiocarbonate groups, carboxylic ester groups and ether groups.

Preferred compounds A are, for example, those of the formula (I)

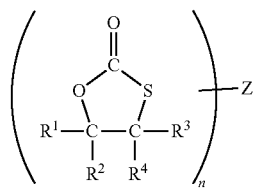

where $R^1$ to $R^4$ are independently hydrogen or an organic group having preferably up to 50 carbon atoms, alternatively $R^2$, $R^4$, and the two carbon atoms of the monothiocarbonate group may together form a five- to ten-membered ring, one of the groups $R^1$ to $R^4$ being a linking group to Z, wherein the linking group may also be a chemical bond, n is an integer greater than or equal to 1, and Z is hydrogen or an n-valent organic group.

In cases in which $R^1$ to $R^4$ are organic groups, these are preferably organic groups having up to 30, more preferably up to 20, carbon atoms. $R^2$ and $R^4$ preferably do not form five- to ten-membered rings with the two carbon atoms of the monothiocarbonate group.

In cases in which $R^1$ to $R^4$ are organic groups, these may include the abovementioned heteroatoms and functional groups, for example oxygen, nitrogen, sulfur, silicon or chlorine, preferably oxygen or chlorine. $R^1$ to $R^4$ may contain, for example, oxygen in the form of ether, hydroxy, aldehyde, keto or carboxyl groups. The organic group is preferably an aliphatic organic group having up to 30 carbon atoms, which may contain oxygen, nitrogen or chlorine.

The organic group is preferably selected from alkyl, —$CH_2$—O—$R^5$, —$CH_2$—O—C(=O)—$R^6$ or —$CH_2$—$NR_7R^8$, where $R^5$ to $R^8$ are organic groups having up to 30, preferably up to 20, carbon atoms. In particular, $R^5$ to $R^8$ are aliphatic or aromatic groups that may contain oxygen, for example in the form of ether groups. $R^5$ to $R^8$ are preferably aliphatic hydrocarbon groups, for example alkyl groups having 1 to 10 carbon atoms, alkoxy groups or polyalkoxy groups. $R^5$ to $R^8$ are particularly preferably aliphatic hydrocarbon groups, in particular alkyl groups having 1 to 10 carbon atoms. The organic group is particularly preferably —$CH_2$—O—$R^5$ or —$CH_2$—C(=O)—$R^6$. Preferably one to three, more preferably two or three of the substituents $R^1$ to $R^4$ in formula (I) are hydrogen and the remaining substituents $R^1$ to $R^4$ are organic groups or the linking group to Z. Particularly preferably, three of the substituents $R^1$ to $R^4$ in formula (I) are hydrogen and $R^1$ or $R^2$ is an organic group or the linking group to Z.

One of the groups $R^1$ to $R^4$ is the linking group to Z. The linking group is preferably a direct bond or —$CH_2$—O— or —$CH_2$—O—C(=O)— or —$CH_2$—$NR^{20}$—, where $R^{20}$ is an aliphatic group, preferably an alkyl group having up to 20 carbon atoms. The linking group is preferably a direct bond or —$CH_2$—O— or —$CH_2$—OC(=O)—. Particular preference is given to the linking group —$CH_2$—O—.

In formula (I), n is 1 or a number greater than or equal to 2, e.g. from 1 to 1000, from 2 to 100 or from 2 to 10. Particularly preferably, n is 1 or from 2 to 5, in particular 2 or 3. Most preferably, n is 2.

Z is hydrogen or an n-valent organic group. In the case of high values for n, e.g. 10 to 1000 or more, Z may be a polymeric group, in particular a polymer chain produced by polymerization or copolymerization, for example by free-radical polymerization of ethylenically unsaturated monomers, by polycondensation or by polyaddition. For example, polyesters or polyamides are obtained by polycondensation with elimination of water or alcohol, or polyurethanes or polyureas are obtained by polyaddition. Such polymeric compounds of the formula (I) are e.g. polymers obtainable by free-radical polymerization or copolymerization of ethylenically unsaturated monomers containing epoxy groups, which are then converted into monothiocarbonate groups.

Z is preferably an n-valent organic group having up to 50 carbon atoms, in particular up 10 to 30 carbon atoms, and which can contain further elements besides carbon and hydrogen, n being a number from 2 to 5, preferably 2 or 3, particularly preferably 2. The n-valent organic group particularly preferably contains only carbon and hydrogen and optionally oxygen and otherwise no further elements.

A preferred group Z is also a polyalkoxylene group of the formula G1:

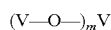

where V is a C2 to C20 alkylene group and m is a number greater than or equal to 1. The C2 to C20 alkylene group is preferably a C2 to C4 alkylene group, in particular ethylene or propylene. The number m may be e.g. from 1 to 100, in particular from 1 to 50.

Another preferred group Z is a group of the formula G2:

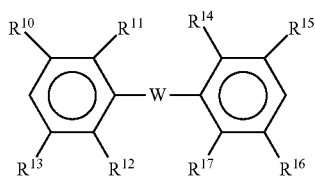

where W is a divalent organic group having up to 10 carbon atoms and n is 2, and $R^{10}$ to $R^{17}$ are independently H or a C1 to C4 alkyl group. Preferably at least six, more preferably all, of the substituents $R^{10}$ to $R^{17}$ are hydrogen. The groups W are for example:

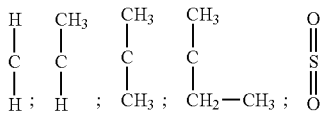

Preferably, W is an organic group consisting only of carbon and hydrogen. More preferably W is

which corresponds to the structure of bisphenol A.

Preferred compounds A having at least 2 five-membered cyclic monothiocarbonates are compounds obtainable by converting all the epoxy groups in the epoxy compounds below into five-membered cyclic monothiocarbonate groups:

Non-Glycidyl Epoxides:
1,2:5,6-Diepoxyhexahydro-4,7-methanoindane, bis(3,4-epoxycyclohexylmethyl) adipate, cyclohexane-1,4-dimethanol bis(3,4-epoxycyclohexane)carboxylate, 1-methyl-4-(2-methyloxiranyl)-7-oxabicyclo[4.1.0]heptane, 4-vinylcyclohexene dioxide, 1,2,5,6-diepoxycyclooctane, 1,2,7,8-diepoxyoctane, dicyclopentadiene dioxide, epoxidized vegetable oils and derivatives thereof, for example soybean oil or derivatives thereof.

Glycidyl Ethers:
Bisphenol A diglycidyl ether (BADGE), hydrogenated BADGE, glycidyl ethers of other di-, tri, tetra- and polyols, for example butanediol diglycidyl ether, trimethylolpropane triglycidyl ether, pentaerythritol tetraglycidyl ether, sorbitol polyglycidyl ether, isosorbide diglycidyl ether, methylphenylpropanediol diglycidyl ether, including oligomeric and polymeric glycidyl ethers, for example polypropylene glycol diglycidyl ether, polyglycerol polyglycidyl ether, novolac glycidyl ether, oligomers or polymers obtainable by reacting bisphenol A with an excess of epichlorohydrin.

Glycidyl Esters:
Tetrahydrophthalic acid diglycidyl ester, diglycidyl 1,2-cyclohexanedicarboxylate, diglycidyl orthophthalate.

Glycidyl Amines:
N,N-Diglycidyl-4-glycidyloxyaniline, tetraglycidyl methylenedianiline Glycidyl Imides:
Triglycidyl Isocyanurate Preferred compounds A having a single monothiocarbonate group are:

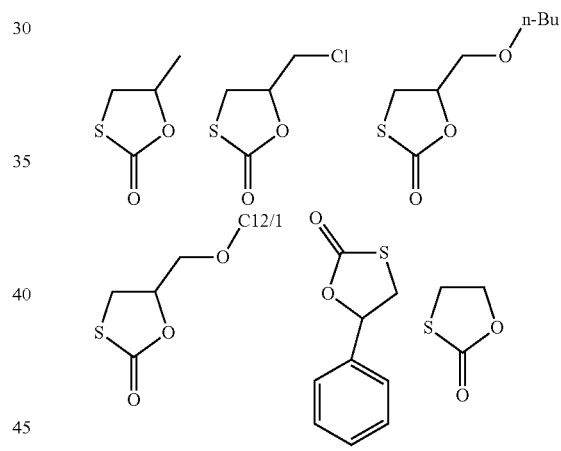

Preferred compounds A having two or more monothiocarbonate groups are:

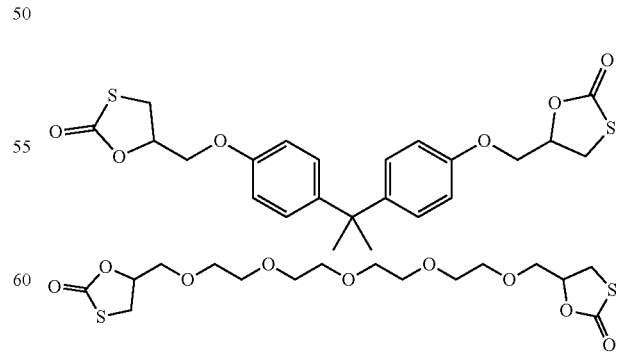

Preferred compounds A having two or more monothiocarbonate groups also include monothiocarbonates derived from multiply epoxidized fats and fatty acid derivatives.

Preferred compounds A are those of the formula II

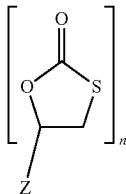
(II)

where n is a number greater than or equal to 1, preferably greater than or equal to 2, and Z is an n-valent organic group or hydrogen, preferably alkyl, aryl, alkenyl, or aralkyl, having preferably in each case up to 50 carbon atoms, in particular up to 30 carbon atoms, in which the group Z may be substituted or unsubstituted and in which the group Z may be interrupted by O, halogen, S, C=O, —C=, —(C=O)— or (C=O)—NR, where R is hydrogen or an organic, preferably aliphatic, group, in particular an alkyl group having preferably up to 20 carbon atoms.

Preferred compounds A also include those of the formula III

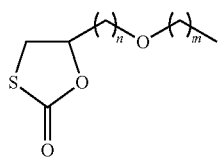
(III)

where n is a number from 1 to 10, preferably 1, and m is a number from 0 to 9, preferably 1 to 5.

Preferred compounds A also include those of the formula (IV)

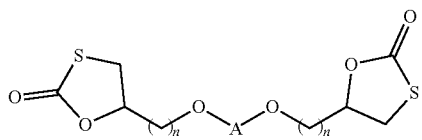
(IV)

where n is a number from 1 to 10, preferably 1, and A is a group selected from -Ph-$CR_aR_b$-Ph- and —($CH_2$—$CH_2$—O)$_m$—$CH_2$—$CH_2$—, where $R_a$ and $R_b$ are independently H or C1 to C4 alkyl, preferably methyl; and m is a number from 0 to 10, preferably 1 to 5. Preferred compounds A also include those of the formula (IV) in which the group -A- is a group —($CH_2$)$_p$—, where p is a number from 1 to 10.

Preferred compounds A also include those of the formula (IV) in which the group -A- is a group —C(=O)—B—C(=O)—, where B is an organic group, preferably a hydrocarbon group, for example -($CH_2$—$CH_2$—O)$_m$—$CH_2$—$CH_2$ or —($CH_2$)$_p$—, where m and p are each a number from 1 to 10.

Also preferred is a compound in which the group -A- is the group

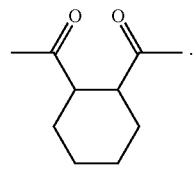

Synthesis of Compound A

Some methods of synthesis for monothiocarbonates are described in the literature. According to U.S. Pat. Nos. 3,072,676 and 3,201,416, ethylene monothiocarbonates can be produced by a two-step process. In a first step, mercaptoethanol and chlorocarboxylates react to form hydroxyethyl thiocarbonates, which are heated in a second step in the presence of a metal salt catalyst, forming ethylene monothiocarbonate.

According to U.S. Pat. No. 3,517,029, alkylene monothiocarbonates are obtained by reacting mercaptoethanol and a carbonate diester in the presence of a catalytically active thorium salt. According to U.S. Pat. No. 3,349,100, alkylene monothiocarbonates are obtained by reacting an epoxide with carbonyl sulfide. A synthesis from phosgene and hydroxymercaptans is described in U.S. Pat. No. 2,828,318. Syntheses of five-membered cyclic monothiocarbonates are also described in EP17186542.1, EP17186545.4, EP17186543.9 and in EP17186544.7.

A process for preparing compound A, in particular compounds of the formula (I), is a process wherein
a) a compound having one, two or more epoxy groups (hereinafter referred to also as epoxy compound) is used as starting material,
b) the compound is reacted with phosgene or an alkyl chloroformate to form an adduct, and
c) the adduct is reacted with a compound that contains anionic sulfur to form a compound that contains one, two or more five-membered, cyclic monothiocarbonate groups.

In step b), phosgene is preferably used. The term phosgene also encompasses phosgene substitutes, i.e. compounds that release phosgene, for example triphosgene. The reaction in step b) is shown below by way of example for a specific epoxy compound having substituent R and with phosgene as the reactant

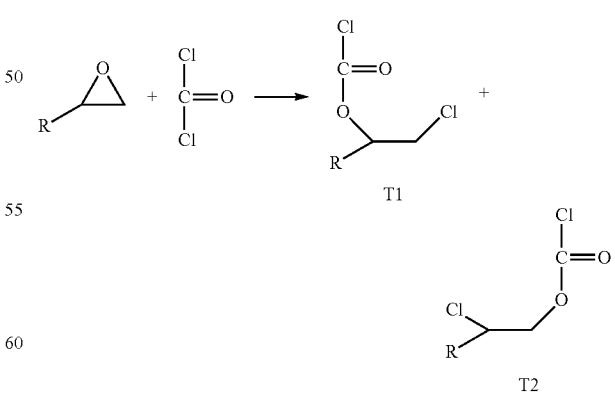

Two structural isomers T1 and T2 of β-chloroalkyl chloroformate T1 and T2 are obtained. Preferably at least 80%, at least 90%, or at least 95% of the adduct corresponds to isomer T1.

The reaction of the epoxy compound with phosgene or an alkyl chloroformate can take place in any stoichiometric ratio. A large excess of epoxy compound is preferably avoided. Phosgene or chloroformate is preferably used in amounts of 0.1 to 5 mol, in particular 0.5 to 2 mol, per mol of epoxy group. It is particularly preferable to use an excess of phosgene or chloroformate. Use of at least equimolar amounts of phosgene or chloroformate avoids unreacted epoxy groups. Phosgene or chloroformate is therefore preferably used in amounts of 0.9 to 5 mol, 1 to 2 mol, or 1 to 1.5 mol per mol of epoxy group.

Phosgene and chloroformate are preferably compounds of the formula

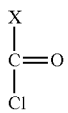

where X is Cl in the case of phosgene or —O—R5 in the case of chloroformate, in which R5 is C1 to C4 alkyl.

The reaction is preferably carried out in the presence of a catalyst. Suitable catalysts are salts having quaternary ammonium cations, for example tetraalkylammonium halides, in particular the chlorides, for example tetrabutylammonium chloride, tetrahexylammonium chloride, benzyltributylammonium chloride or trioctylmethylammonium chloride. Further catalysts are hexaalkylguanidinium halides, in particular the chlorides, quaternary phosphonium halides, in particular the chlorides, pyridines or other compounds having a nitrogen-containing ring system such as imidazoles or alkylated imidazoles. Preferred catalysts are salts having a quaternary ammonium cation, in particular tetraalkylammonium salts, for example tetra(n-butyl)ammonium chloride. The catalyst is preferably used in amounts of 0.001 to 0.1 mol, in particular 0.005 to 0.05 mol, per mole of epoxy group.

Preferably phosgene or alkyl chloroformate is added to the epoxy compound. Since the reaction is exothermic, the addition is carried out slowly and/or with cooling. The reaction temperature is preferably kept at −40 to 60° C., or at 5 to 50° C.

Low-molecular-weight epoxy compounds are often liquid, which means that an additional solvent is not needed. If the epoxy compound is solid at 21° C., it is preferable to use a solvent. Suitable solvents are, for example, aprotic solvents, e.g. hydrocarbons including aromatic hydrocarbons and chlorinated hydrocarbons. Liquid epoxy compounds may also be used as solvents for solid epoxy compounds.

Starting from the β-chloroalkyl chloroformates prepared as described above, the following reaction step is illustrated using Na$_2$S by way of example as follows:

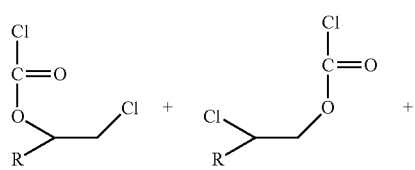

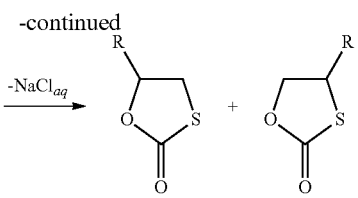

The ratio of the structural isomers T1 and T2 is generally retained here.

In step c) a solvent may be used. Suitable solvents are, for example, aprotic solvents, e.g. hydrocarbons including aromatic hydrocarbons and chlorinated hydrocarbons or hydrophilic aprotic solvents, e.g. ethers such as tetrahydrofuran, dioxane, polyethers (e.g. glycol diethers, glyme), acetonitrile or dimethyl sulfoxide.

The product from step b) is reacted with a compound containing anionic sulfur, preferably a salt. The anionic sulfur is preferably $S^{2-}$, a polysulfide $(S_p)^{2-}$ where p is a number from 2 to 200, preferably 2 to 10, or $HS^{1-}$. The cation of the salt may be organic or inorganic, preferably an inorganic metal cation. Metal cations are, for example, cations of alkali metals or alkaline earth metals, such as sodium or potassium. Preferred sulfur salts are Na$_2$S, K$_2$S, NaSH and KSH or the hydrates thereof. The sulfur salt may be used in combination with a basic compound, in particular a metal hydroxide, for example NaOH or KOH. A basic compound is preferably used as the anion in the case of $SH^-$. Since the reaction is exothermic, the salt or a solution of the salt is added slowly and/or with cooling. The reaction temperature is preferably kept at −40 to 60° C., or at −10 to 50° C. The salt is preferably used in an amount from 0.5 to 2.0 mol, more preferably from 1.0 to 2.0 mol or from 1.0 to 1.2 mol, per mol of β-chloroalkyl chloroformate group. Reaction step c) can take place in the presence of a catalyst, for example a phase-transfer catalyst such as ammonium salts, heterocyclic ammonium salts or phosphonium salts. The reaction with the sulfur salt converts the β-chloroalkyl chloroformate groups into five-membered cyclic monothiocarbonate groups. The five-membered ring is here formed from three carbon atoms, one oxygen atom, and one sulfur atom, with a further oxygen atom being connected by a double bond to the carbon atom between the oxygen atom and the sulfur atom of the ring system.

The two-component adhesive comprises in a second component at least one curing compound B selected from compounds having at least one functional group selected from primary amine groups and secondary amine groups (hereinafter referred to collectively as amine curing agents), it being possible also for the at least one functional group to be present in masked, latently reactive form.

Compound B is preferably selected from polyamines having at least two primary or secondary amine groups. Compound B is particularly preferably a compound having at least two primary amino groups. When compound A has two or more cyclic thiocarbonate groups, it is also possible to use curing compounds B that have only one functional group reactive toward cyclic thiocarbonate groups, i.e. only one primary or secondary amine group.

Suitable monoamines are, for example, monoalkylamines and dialkylamines having preferably 1 to 30 or 1 to 20 carbon atoms.

In the process according to the invention, the monothiocarbonates react with amine curing agents to form mercaptourethanes or mercaptopolyurethanes. This results in the formation of compounds having one or more urethane groups and one or more SH groups. Suitable amines here are primary and secondary amines having alkyl groups, aryl groups, aralkyl groups or alkaryl groups as radicals. Primary amines react more rapidly than secondary amines and aliphatic amines react more rapidly than aromatic amines. In particular, higher-molecular-weight polyamines such as Jeffamines® from Huntsman Corp. and polyetheramines from BASF SE are suitable here.

In the case of primary amines of the formula R'—NH$_2$, the reaction can be represented as follows:

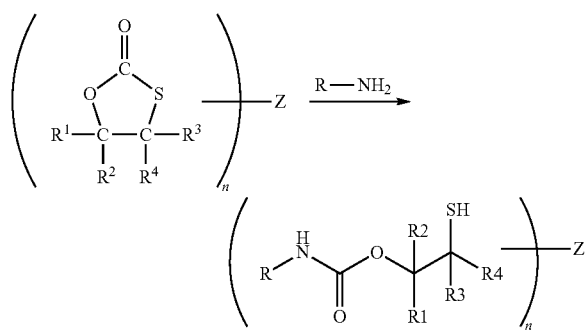

Mixtures of compounds A having cyclic monothiocarbonate groups with a suitable, preferably multifunctional curing compound B may be used as a two-component adhesive with compound A in a first component and curing compound B in a second component Compound A preferably has at least 2 or more cyclic monothiocarbonate groups. The curing component B preferably has at least two functional groups selected from the group consisting of primary amino groups and secondary amino groups. Preference is also given to a mixture consisting of at least one compound A having 2 or more cyclic monothiocarbonate groups, at least one monofunctional curing compound B having only one primary or secondary amine group, and a compound C having two, three or more functional groups reactive toward SH groups, preferably groups having ethylenically unsaturated bonds or epoxy groups.

Mixtures of different thiocarbonates may also be used, for example a small amount of a "rapidly" reacting thiocarbonate that establishes immediate strength without reducing the pot life of the adhesive too much, plus a slow thiocarbonate for final curing.

The two-component adhesive preferably comprises at least one catalyst for catalyzing the reaction of the cyclic monothiocarbonate groups with the functional groups in the curing agent and/or at least one catalyst for catalyzing the reaction of the formed intermediate thiol with SH-reactive groups.

Mixtures of different curing compounds may also be used, for example a small amount of a rapid curing agent that establishes immediate strength without reducing the pot life of the adhesive too much, plus a slow curing agent for final curing.

The functional groups in the curing agent are preferably selected from aliphatic primary amino groups and aliphatic secondary amino groups.

A two-component adhesive is understood as meaning an adhesive that preferably comprises at least two polyfunctional adhesive constituents that react with one another with bond formation, thereby forming a polymer network. Accordingly, two-component adhesive compositions preferably comprise, in addition to at least one polyfunctional monothiocarbonate compound A, at least one compound B that has at least 2 functional groups F, e.g. 2, 3, 4, 5, 6, 7, 8, 9 or 10 functional groups F, which are preferably selected from aliphatic primary amino groups and secondary amino groups, or at least one compound C having at least two functional groups reactive toward SH groups. The compounds B are hereinafter referred to also as curing agents. The amount of curing agent is preferably chosen such that the molar ratio of monothiocarbonate functional groups to functional groups F in the curing agent is within a range from 1:10 to 10:1, in particular within a range from 5:1 to 1:5, and specifically within a range from 1:2 to 2:1.

The curing agent may be a low-molecular-weight substance, i.e. one having a molecular weight below 500 g/mol, or an oligomeric or polymeric substance that has a number-average molecular weight above 500 g/mol.

For particularly good adhesion, it is preferable that either the compound A or the curing compound B, or compound C, or compound A and compound B, or compound A and compound C, or compound B and compound C, or compounds A, B, and C each contain at least one flexible spacer group. A flexible spacer group is a linear or branched linking group that has a molecular weight of at least 200 g/mol. The spacer group may form the group R$_1$ or part of the group R$_1$ or the linking group to Z or part of the linking group to Z in formula (I) and/or the spacer group may be situated between two functional groups in the curing agent B. The spacer group is preferably selected from alkylene groups, polyether groups, polycarbonate groups, polyester groups, and poly (meth)acrylate groups. Examples of spacer groups are linear or branched alkylene groups having at least 15 carbon atoms; polyether groups of the general formula (A-O)$_m$—, where A is a C2 to C5 alkylene and m is a number chosen such that the molecular weight of (A-O)$_m$— is at least 200 g/mol; polycarbonate groups; polyester groups; and poly (meth)acrylate groups. A preferred spacer group is alkoxylated glycerol, for example ethoxylated glycerol, propoxylated glycerol, and ethoxylated/propoxylated glycerol.

Aminic curing agents, hereinafter referred to also as amine curing agents, include, for example, aliphatic and cycloaliphatic monoamines and polyamines, aromatic and araliphatic monoamines and polyamines, and also polymeric amines, for example aminoplasts and polyamidoamines. Amine curing agents crosslink polymers that have monothiocarbonate groups through reaction of the primary or secondary amino functions of the polyamines with the thiocarbonate groups to form urethane functions. Preferred polyamine curing agents have an average of at least two primary or secondary amino groups per molecule, e.g. two, three or four primary or secondary amino groups per molecule. They may additionally contain one or more tertiary amino groups. Examples of suitable amines are aliphatic polyamines such as ethylenediamine, propane-1,2-diamine and -1,3-diamine, neopentanediamine, hexamethylenediamine, octamethylenediamine, 1,10-diaminodecane, 1,12-diaminododecane, diethylenetriamine, triethylenetetramine, tetraethylenepentamine, 2,2-dimethylpropylenediamine, trimethylhexamethylenediamine, 1-(3-aminopropyl)-3-aminopropane, 1,3-bis(3-aminopropyl)propane, 4-ethyl-4-methylamino-1-octylamine, and the like;

cycloaliphatic diamines such as 1,2-diaminocyclohexane, 1,2-, 1,3-, 1,4-bis(aminomethyl)cyclohexane, 1-methyl-2,4-diaminocyclohexane, N-cyclohexylpropylene-1,3-diamine, 4-(2-aminopropan-2-yl)-1-methylcyclohexan-1-amine, isophoronediamine, 4,4'-diaminodicyclohexylmethane, 3,3'-dimethyl-4,4'- diaminodicyclohexylmethane, 3,3',5,5'-tetramethyl-4,4'-diaminodicyclohexylmethane, 4,8-diamino-tricyclo[5.2.1.0]decane, norbornanediamine, menthanediamine, menthenediamine, and the like;

aromatic diamines such as tolylenediamine, xylylenediamine, in particular meta-xylylenediamine (MXDA), bis(4-aminophenyl)methane (MDA or methylenedianiline), bis(4-aminophenyl)sulfone (also known as DADS, DDS or dapsone), and the like;

cyclic polyamines such as piperazine, N-aminoethylpiperazine, and the like;

polyetheramines, in particular difunctional and trifunctional primary polyetheramines based on polypropylene glycol, polyethylene glycol, polybutylene oxide, poly(butane-1,4-diol), polytetrahydrofuran (polyTHF) or polypentylene oxide, e.g. 4,7,10-trioxatridecane-1,3-diamine, 4,7,10-trioxatridecane-1,13-diamine, 1,8-diamino-3,6-dioxaoctane (XTJ-504, from Huntsman), 1,10-diamino-4,7-dioxadecane (XTJ-590, from Huntsman), 1,12-diamino-4,9-dioxadodecane (from BASF SE), 1,3-diamino-4,7,10-trioxatridecane (from BASF SE), primary polyetheramines based on polypropylene glycol and having an average molar mass of 230, such as Polyetheramine D 230 (from BASF SE) or Jeffamine® D 230 (from Huntsman), difunctional, primary polyetheramines based on polypropylene glycol and having an average molar mass of 400, such as Polyetheramine D 400 (from BASF SE) or Jeffamine® XTJ 582 (from Huntsman), difunctional, primary polyetheramines based on polypropylene glycol and having an average molar mass of 2000, such as Polyetheramine D 2000 (from BASF SE), Jeffamine® D2000 or Jeffamine® XTJ 578 (in each case from Huntsman), difunctional, primary polyetheramines based on propylene oxide having an average molar mass of 4000, such as Polyetheramine D 4000 (from BASF SE), trifunctional, primary polyetheramines prepared by reacting propylene oxide with trimethylolpropane followed by amination of the terminal OH groups and having an average molar mass of 403, such as Polyetheramine T 403 (from BASF SE) or Jeffamine® T 403 (from Huntsman), trifunctional, primary polyetheramines prepared by reacting propylene oxide with glycerol followed by amination of the terminal OH groups and having an average molar mass of 5000, such as Polyetheramine T 5000 (from BASF SE) or Jeffamine® T 5000 (from Huntsman), aliphatic polyetheramines formed from a polyethylene glycol grafted with propylene oxide and having an average molar mass of 600, such as Jeffamine® ED-600 or Jeffamine® XTJ-501 (from Huntsman), aliphatic polyetheramines formed from a polyethylene glycol grafted with propylene oxide and having an average molar mass of 900, such as Jeffamine® ED-900 (from Huntsman), aliphatic polyetheramines formed from a polyethylene glycol grafted with propylene oxide and having an average molar mass of 2000, such as Jeffamine® ED-2003 (from Huntsman), difunctional, primary polyetheramines prepared by amination of a diethylene glycol grafted with propylene oxide and having an average molar mass of 220, such as Jeffamine® HK-511 (from Huntsman), aliphatic polyetheramines based on a copolymer formed from poly(tetramethylene ether glycol) and polypropylene glycol and having an average molar mass of 1000, such as Jeffamine® XTJ-542 (from Huntsman), aliphatic polyetheramines based on a copolymer formed from poly(tetramethylene ether glycol) and polypropylene glycol and having an average molar mass of 1900, such as Jeffamine® XTJ-548 (from Huntsman), aliphatic polyetheramines based on a copolymer formed from poly(tetramethylene ether glycol) and polypropylene glycol and having an average molar mass of 1400, such as Jeffamine® XTJ-559 (from Huntsman), polyethertriamines based on an at least trihydric alcohol grafted with butylene oxide and having an average molar mass of 400, such as Jeffamine® XTJ-566 (from Huntsman), aliphatic polyetheramines prepared by amination of alcohols grafted with butylene oxide and having an average molar mass of 219, such as Jeffamine® XTJ-568 (from Huntsman), polyetheramines based on pentaerythritol and propylene oxide and having an average molar mass of 600, such as Jeffamine® XTJ-616 (from Huntsman), polyetheramines based on triethylene glycol and having an average molar mass of 148, e.g. Jeffamine® EDR-148 (from Huntsman), difunctional, primary polyetheramines prepared by amination of an ethylene glycol grafted with propylene oxide and having an average molar mass of 176, such as Jeffamine® EDR-176 (from Huntsman), and polyetheramines prepared by amination of polytetrahydrofuran (polyTHF) and having an average molar mass of 250, e.g. PolyTHF-Amine 350 (from BASF SE) and mixtures of said amines.

polyamidoamines (amidopolyamines) obtainable by reacting dimeric fatty acids (e.g. linoleic acid dimer) with low-molecular-weight polyamines such as diethylenetriamine, 1-(3-aminopropyl)-3-aminopropane or triethylenetetramine or other diamines such as the aliphatic or cycloaliphatic diamines mentioned previously;

adducts obtainable by reacting amines, in particular diamines, with a substoichiometric amount of epoxy resin or reactive diluent, preference being given to the use of adducts in which approx. 5 to 20% of the epoxy groups have been reacted with amines, in particular diamines;

phenalkamines, such as those known from epoxide chemistry;

Mannich bases, for example those prepared through condensation of polyamines, preferably diethylenetriamine, triethylenetetramine, isophoronediamine, 2,2,4- and 2,4,4-trimethylhexamethylenediamine, 1,3- and 1,4-bis(aminomethyl)cyclohexane with aldehydes, preferably formaldehyde, and monohydric or polyhydric phenols having at least one aldehyde-reactive ring position, e.g. the various cresols and xylenols, p-tert-butylphenol, resorcinol, 4,4'-dihydroxydiphenylmethane, 4,4'-dihydroxy-2,2-diphenylpropane, but preferably phenol;

and also mixtures of the abovementioned amine curing agents, in particular mixtures of difunctional amines from the group of aliphatic, cycloaliphatic, and aromatic amines with the abovementioned polyetheramines.

Preferred aminic curing agents are aliphatic polyamines, in particular 2,2-dimethylpropylenediamine, aromatic diamines, in particular m-xylylenediamine (MXDA) and cycloaliphatic diamines, in particular isophoronediamine, N-cyclohexylpropylene-1,3-diamine and 4,4'-diaminodicyclohexylmethane (Dicykan). Preference is also given to difunctional or trifunctional primary polyetheramines based on polypropylene glycol such as Jeffamine® D 230 or Jeffamine® T 403. Particular preference is given to polyamines in which there is high mobility and low steric hindrance about the amino group, for example 4,9-dioxadodecane-1,12-diamine, 4,7,10-trioxatridecane-1,13-diamine, PolyTHF-Amine 350 (BASF SE).

Preference is also given to mixtures of the amines mentioned as preferred, for example mixtures that contain 2,2-dimethylpropylenamine and isophoronamine.

Preference is also given to curing compounds B of low steric bulk, for example without quaternary carbon atoms. Examples thereof are alpha,omega-diamino-n-alkanes, in which the alkyl chain may be interrupted by oxygen atoms (for example 4,9-dioxadodecane-1,12-diamine) or polyethyleneimine (for example Luprasol® FG).

Preference is also given to adhesive mixtures having the longest possible open time, which are obtained by using curing compounds B in which the functional groups are present in masked, latently reactive form, for example in the form of oxazolidines, aldimines, ketimines or enamines.

Also suitable as curing agents are amino acids, for example lysine, arginine, glutamine, and asparagine and stereoisomers and mixtures thereof.

Mixtures of different curing agents may of course also be used, for example mixtures of one or more aminic curing agents or mixtures of one or more aminic curing agents with one or more amino acids.

In the adhesive compositions according to the invention, the total amount of curing agents is preferably 0.1% to 50% by weight, commonly 0.5% to 40% by weight, and in particular 1% to 30% by weight, based on the total amount of cyclic monothiocarbonate compounds plus curing agents used.

The adhesive composition can be cured thermally by heating the mixture of compound A and curing compound B to a temperature above the mixing temperature. Curing may also take place at relatively low temperatures. The adhesive compositions according to the invention are typically cured at temperatures within a range from −10° C. to 150° C., preferably within a range from 0 to 100° C., and in particular within a range from 10 to 70° C. Curing at temperatures of 20-30° C. is particularly advantageous. Which temperature is suitable depends on the particular curing agent and on the desired curing rate and can be established in the individual case by those skilled in the art, for example on the basis of simple preliminary tests. In the lower temperature range (5 to approx. 35° C.), which corresponds to the generally prevailing ambient temperature, it is of course sufficient to mix compound A and curing compound B. Alternatively, curing is preferably microwave-induced.

The two-component adhesive compositions may also comprise one or more suitable catalysts for the curing, which are guided in known manner by the nature of the reactive functional groups F. Catalysts, if desired, are used in proportions of 0.01% by weight to about 10% by weight based on the sum of compounds A and B. In one embodiment, no catalysts are needed, particularly in the case of curing agents that have amino groups as functional groups, i.e. the content of catalysts in the composition is then less than 0.01% by weight. Catalysts are preferably used when the curing agent has additional reactive groups F that are different from amino groups.

Catalysts used with preference are basic catalysts, particularly preferably organic amines and organic phosphines. Preferred organic amines are amidine bases such as 1,8-diazabicyclo[5.4.0]undec-7-ene (DBU), 1,5-diazabicyclo[4.3.0]non-5-ene (DBN), and mono$C_1$-$C_6$ alkylamines, di-$C_1$-$C_6$ alkylamines, and tri-$C_1$-$C_6$ alkylamines, in particular triethylamine and tert-butylamine. Preferred organic phosphines are trialkylphosphines and triarylphosphines, for example tri-n-butylphosphine and triphenylphosphine. The catalysts may of course also be used in the form of mixtures, optionally in combination with tri-Cr $C_6$ alkylammonium halides and copper salts, for example triphenylphosphine in combination with a tri-$C_1$-$C_6$ alkylammonium halide and a copper salt, for example copper(I) chloride, copper(I) bromide, copper(II) chloride or copper(II) sulfate.

The curing compound B of the two-component adhesive may be a compound B1 that, in addition to the at least one functional group selected from primary amine groups and secondary amine groups, still has at least one ethylenically unsaturated bond reactive toward SH groups. Molecular weights and numbers of functional groups, including groups reactive toward SH groups, are preferably as described for compound B. Compound B1 preferably has one, two or three primary or secondary amine groups, particularly preferably at least one or precisely one primary amine group. Compound B1 preferably has one, two or three groups reactive toward SH groups. The group in B1 that is reactive toward SH groups is preferably a non-aromatic C—C double bond or a C—C triple bond. Compound B1 preferably contains no other functional groups aside from bonds reactive toward SH groups, primary or secondary amine groups, hydroxy groups, carboxylic ester groups, and ether groups. Compound B1 is particularly preferably a compound having only one primary amino group and only one non-aromatic C—C double bond.

Examples of suitable compounds B1 are aminoalkyl vinyl ethers having 1 to 10 carbon atoms in the alkyl group (e.g. aminopropyl vinyl ether) or allylamine:

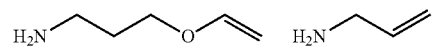

The two-component adhesive may optionally comprise in the first component, in the second component, and/or in a further component at least one compound C that has a number $n_{C3}$ of functional groups reactive toward SH groups, e.g. groups having ethylenically unsaturated multiple bonds, preferably having ethylenically unsaturated double bonds or epoxy groups, and where $n_{C3}$ is an integer greater than or equal to 1. Particular preference is given to (meth)acrylic, allylic, and vinylic C—C double bonds. Preference is also given to using a mixture of at least one compound having at least one group having ethylenically unsaturated multiple bonds and at least one compound having at least one epoxy group.

Compounds C may have a molecular weight of up to 500 000 g/mol. In the case of polymers, this is the weight-average molecular weight, measured by gel-permeation chromatography in THF using a polystyrene standard. Compounds C preferably have a molecular weight of up to 1000 g/mol, particularly preferably from 60 g/mol to 500 g/mol.

It is possible for compounds C to have, for example, up to 1000, in particular up to 500, preferably up to 100, groups reactive toward SH groups. Compounds C particularly preferably have two or three groups reactive toward SH groups. Ethylenically unsaturated multiple bonds reactive toward SH groups may be non-aromatic C—C double bonds or C—C triple bonds, with non-aromatic C—C double bonds particularly preferred. A triple bond can react twice with SH groups. An SH group can first add to a triple bond, converting the triple bond into a double bond. The double bond formed can react with a further SH group. A triple bond is therefore equivalent to two ethylenically unsaturated bonds reactive toward SH groups. Compounds C having only one unsaturated group are also referred to as monomers; compounds C having at least two unsaturated groups are also referred to as oligomers. Such oligomers preferably have 2 to 10, in particular 2 or 3, unsaturated groups.

Preferred compounds C are compounds that have at least one of the following groups:

Vinyl group CH₂=CH—; vinylene group —CH=CH—; unsaturated carbonyl group CH₂=CRC(=O)— where R=H or alkyl; acryl group CH₂=CH—C(=O)—O—; methacryl group CH₂=C(CH₃)—C(=O)—O, acrylamido group CH₂=CH—C(=O)—N, cyanoacryl group CH₂=C(CN)—C(=O)—O, methylenemalonato group CH₂=C[C(=O)—O]₂ vinylene-1,3-dicarbonyl group CH₂=C[C(=O)—]₂-1,4-dicarboxyalkylene group —OC(=O)—CH=CH—C(=O)O—], allyl group CH₂=CH—CH₂—, in particular allyl ether CH₂=CH—CH₂—O—, maleimido group or crotonyl group. Preferred monofunctional compounds C are acryloyl and methacryloyl compounds, vinyl esters, for example vinyl acetate, vinyl ethers, vinyl lactams, for example N-vinylpyrrolidone, vinyl aromatics, for example styrene, vinyl halides, for example vinyl chloride, vinyl fluoride, olefins having a single C—C double bond, for example ethylene, propylene.

The designation "(meth)acryloyl . . . " and similar designations are used occasionally hereinafter as shorthand for "acryloyl . . . or methacryloyl . . . ". In the designation Cx alkyl (meth)acrylate and analogous designations, x is the number of carbon atoms in the alkyl group.

Particularly preferred compounds C are (meth)acryloyl compounds and vinyl ethers. Examples of (meth)acryloyl compounds are (meth)acrylic esters, in particular alkyl or hydroxyalkyl (meth)acrylates, (meth)acrylonitrile or (meth)acrylic acid. Vinyl ethers are, for example, vinyl alkyl ethers. Alkyl groups preferably have 1 to 20, particularly preferably 1 to 8, carbon atoms.

Compounds C containing a triple bond are, for example, alkynes such as acetylene or propyne, propargyl alcohol, ethers of propargyl alcohol, esters of propargyl alcohol, propargylamine or amides of propargylamine.

Preferred compounds C are in particular compounds having at least two (meth)acrylate groups, compounds having at least two vinyl groups, olefins having at least two C—C double bonds, polyesters substituted with two or more ethylenically unsaturated groups, cyanurates substituted with two or more ethylenically unsaturated groups or isocyanurates substituted with two or more ethylenically unsaturated groups. Olefins having two or more C—C double bonds are, for example, butadiene, cyclooctadiene, cyclododecatriene, isoprene, limonene, divinylcyclohexane, polybutadiene or polyisoprene. Compounds C having at least two (meth)acryloyl groups are, for example, (meth)acrylic esters of polyfunctional alcohols or of alkoxylated polyfunctional alcohols. Examples of polyfunctional alcohols are bifunctional alcohols, such as ethylene glycol, diethylene glycol, triethylene glycol, propylene glycol, dipropylene glycol, tripropylene glycol, butanediol, pentanediol, hexanediol, neopentyl glycol, alkoxylated phenols, such as ethoxylated or propoxylated bisphenols, and cyclohexanedimethanol. Trifunctional and higher functional alcohols are, for example, glycerol, trimethylolpropane, butanetriol, trimethylolethane, pentaerythritol, ditrimethylolpropane, dipentaerythritol, sorbitol, mannitol and the corresponding alkoxylated, especially ethoxylated and/or propoxylated alcohols.

Also suitable as compounds C having more than two unsaturated groups are (meth)acrylic esters of polyesterols.

Suitable polyesterols are, for example, ones that can be prepared by esterifying polycarboxylic acids, preferably dicarboxylic acids, with polyols, preferably with diols. Preferred dicarboxylic acids are succinic acid, glutaric acid, adipic acid, sebacic acid, and orthophthalic acid and the isomers and hydrogenation products thereof, and also the esterifiable or transesterifiable derivatives of said acids, for example the anhydrides and alkyl esters thereof. Also suitable as dicarboxylic acids are maleic acid, fumaric acid, and tetrahydrophthalic acid or their anhydrides. Preferred polyols are ethylene glycol, 1,2- and 1,3-propylene glycol, butane-1,4-diol, hexane-1,6-diol, neopentyl glycol, cyclohexanedimethanol, and polyglycols of ethylene glycol and/or propylene glycol.

Also suitable as compounds C having two or more ethylenically unsaturated groups are epoxy (meth)acrylates and urethane (meth)acrylates. Epoxy (meth)acrylates are, for example, those that can be prepared by reacting epoxidized olefins or poly-, mono- or diglycidyl ethers such as bisphenol A diglycidyl ether with (meth)acrylic acid. Urethane (meth)acrylates are, for example, the reaction products of hydroxyalkyl (meth)acrylates with poly- or diisocyanates.

Compounds C having two or more ethylenically unsaturated groups also include unsaturated polyesters, in particular those containing C—C double bonds from maleic acid, itaconic acid or fumaric acid units. Compounds C having two or more ethylenically unsaturated groups also include those having at least two vinyl groups, for example divinyl ethers such as diethylene glycol divinyl ether or triethylene glycol divinyl ether or divinyl sulfone. Also suitable as compounds C having two or more ethylenically unsaturated groups are:

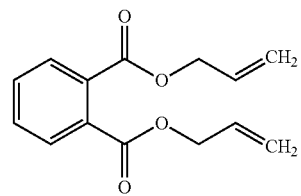

Diallyl orthophthalate

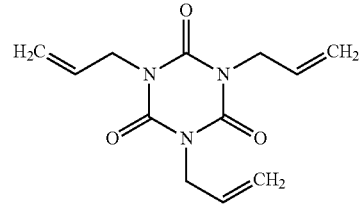

Triallyl isocyanurate

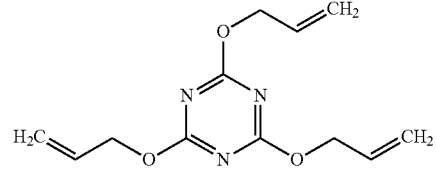

Triallyl Cyanurate

Particularly preferred compounds C are (meth)acrylic esters of polyfunctional alcohols, or compounds having vinyl ether groups or unsaturated polyesters, in particular trimethylolpropane tri(meth)acrylate and alkanediol di(meth)acrylates of C2 to C8 alkanediols.

Preferred compounds C are in particular polyfunctional (meth)acrylic esters available under the names Laromer® (BASF), Sartomer® (Arkema) or Miramer® (Miwon); or methacrylamides.

Also suitable as compounds C are those having at least one epoxy group, for example compounds obtainable by reacting compounds having at least one alcohol group with epichlorohydrin.

Compounds C having one epoxy group are, for example, epichlorohydrin or derivatives thereof in which the chloride of the epichlorohydrin is replaced by a hydroxy group (glycidol), by an ether group (glycidyl ether), by an ester group (glycidyl ester) or by an amino group (glycidyl amine).

Examples of compound C having at least two epoxy groups are the diglycidyl ethers of bisphenol A or of bisphenol F or of bisphenol S, the diglycidyl ethers of hydrogenated bisphenol A or of hydrogenated bisphenol F, and diglycidyl ethers of aliphatic diols, for example diglycidyl ethers of polyalkoxylene diols. Also suitable are oligoglycidyl ethers of aligoalcohols. Further examples also include epoxy resins obtainable by using compounds having at least two alcohol groups in excess with respect to epichlorohydrin. In epoxy resins of this kind, the degree of polymerization of the compound having at least two alcohol groups is preferably 2 to 25, in particular 2 to 10.

Further examples for compound C are epoxidized fatty acids, epoxidized fatty acid esters, and epoxidized fatty alcohols that in each case have at least two epoxy groups. Further examples for compound C are tetraglycidyl methylenedianiline (TGMDA), triglycidyl aminophenol, and triglycidyl isocyanurate (see below)

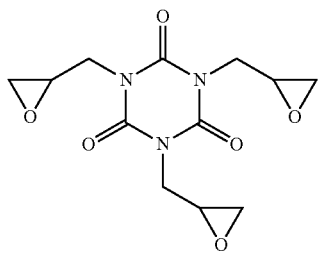 [SMILES: O=c1n(CC2CO2)c(=O)n(CC2CO2)c(=O)n1CC1CO1]

Further compounds C having more than one epoxy group are obtainable by polymerization or copolymerization of glycidyl (meth)acrylate or of glycidyl vinyl ether.

The reaction of the monothiocarbonate groups in compound A with the functional groups in compound B of the two-component adhesive initially results in the formation of compounds having SH groups. These SH groups are very reactive and can react further, for example with the SH-reactive functional groups in compounds B or C. Depending on the number of functionalities in compounds A, B, and C, this can result in the formation of crosslinked polymers or polymers having side groups linked via an S atom.

If the two-component adhesive does not comprise any compounds having SH-reactive groups, the SH groups can oxidize with atmospheric oxygen and e.g. form disulfide bridges.

The number of functional groups in compounds A, B and C is preferably such that this results in the formation of polymers, more preferably crosslinked polymers. It is particularly preferable when the sum of the number of monothiocarbonate groups in compound A and of the functional groups in compound B reactive therewith is greater than or equal to 3, in particular greater than or equal to 4 and when a compound C is present in which the number of functional groups reactive toward SH groups is greater than or equal to 2.

The two-component adhesive preferably comprises curing compound B in an amount such that the amount $n_B$ of functional groups in curing compound B is from 50 mol % to 150 mol %, preferably from 80 mol % to 120 mol %, based on the amount $n_B$ of cyclic thiocarbonate groups in compound A. The two-component adhesive preferably comprises compound C in an amount such that the amount of reactive double bonds $n_{C3}$ is from 0 to 120 mol %, preferably from 90 to 110 mol %, based on the amount $n_A$ of cyclic thiocarbonate groups.

For storage prior to use, compounds A and B may be held in separate components that are mixed only shortly before use. Compound C can either likewise be present in a separate component or be already mixed with compound A and/or compound B. When compounds B and C are mixed in one component, compound B is preferably present in a masked, latently reactive form.

The two-component adhesive is preferably used and cured at temperatures from −20 to 250° C., more preferably from 20 to 100° C. The two-component adhesive according to the invention is able to develop high bonding strengths within a short space of time and with amine curing agents in particular, even at room temperature. Preference is therefore given to a bonding process in which bonding takes place at temperatures of less than or equal to 30° C., preferably without heating.

In addition to the abovementioned constituents, the adhesive composition may comprise the additives customary for this purpose. The choice of suitable conventional additives for the composition according to the invention depends on the particular intended use and can be determined in the individual case by those skilled in the art.

Examples of suitable additives include catalysts, initiators, inhibitors, antioxidants, UV absorbers/light stabilizers, metal deactivators, antistatic agents, reinforcers, fillers, antifogging agents, biocides, plasticizers, lubricants, emulsifiers, colorants, pigments, rheological agents, adhesion regulators, optical brighteners, flame retardants, antidrip agents, nucleating agents, wetting agents, thickeners, protective colloids, defoamers, tackifiers, solvents and reactive diluents, and mixtures thereof.

The adhesive preferably comprises at least one catalyst for catalyzing the reaction of the cyclic carbonate groups in compound A with the functional groups in curing compound B and/or at least one catalyst or initiator for catalyzing or initiating the reaction of SH groups with one another or the reaction of SH groups with the functional groups that are reactive therewith, for example with ethylenically unsaturated double bonds.

Suitable catalysts for catalyzing the reaction of the cyclic carbonate groups in compound A with the functional groups in curing compound B are, for example, basic catalysts such as tertiary amines, pyridines, guanidines or organic phosphines, for example 1,8-diazabicyclo[5.4.0]undec-7-ene (DBU), 1,5-diazabicyclo[4.3.0]non-5-ene (DBN); tri-C1-C6 alkylamines, particularly preferably triethylamine. Organic phosphines are, for example, trialkylphosphines such as tri-n-butylphosphine or triarylphosphines such as triphenylphosphine.

Suitable catalysts or initiators for catalyzing or initiating the reaction of SH groups with one another or the reaction of SH groups with ethylenically unsaturated double bonds are, for example, compounds that form free radicals, e.g. azo initiators such as AIBN, organic peroxide compounds, redox pairs (H$_2$O$_2$, tert-butyl peroxide, ascorbic acid) and also photoinitiators and oxygen itself. In the case of activated double bonds (so-called Michael systems), the reaction of the double bond can take place nucleophilically and can therefore be catalyzed e.g. by tertiary amines, guanidines, pyridines, phosphines, etc. In the case of non-activated double bonds, the reaction of the double bond can take place in a free-radical process and can be initiated thermally with a radical initiator or photochemically with a photoinitiator.

The optionally used light stabilizers/UV absorbers, antioxidants, and metal deactivators preferably have high migration stability and thermal stability. They are selected, for example, from groups a) to t). The compounds in groups a) to g) and i) are light stabilizers/UV absorbers, whereas compounds j) to t) act as stabilizers.

a) 4,4-diarylbutadienes,
b) cinnamic esters,
c) benzotriazoles,
d) hydroxybenzophenones,
e) diphenylcyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds,
s) polyamide stabilizers, and
t) basic co-stabilizers.

The two-component adhesive is preferably free from isocyanates, i.e. it preferably does not comprise any isocyanate compounds as curing agents.

The two-component adhesive is preferably present either in the form of a solution in an organic solvent (for example THF, acetone, ethyl acetate, acetonitrile, toluene), but is preferably solvent-free. Solvent-free means that it contains less than 5% by weight of organic solvent or water, more preferably less than 2% by weight or none at all.

The components of the adhesive are preferably liquid at the time of mixing at 23° C. and preferably have a zero-shear viscosity of less than 1000 Pa s, preferably less than 500 Pa s, more preferably less than 100 Pa s. After the components have been mixed, the two-component adhesive in the not yet cured state has a zero-shear viscosity at 70° C., preferably at 40° C. too, particularly preferably at 23° C. too, of preferably less than 3000 Pa s, or less than 1500 Pa s, particularly preferably less than 300 Pa s.

The two-component adhesive has a bonding strength of preferably greater than 1.5 N/15 mm, measured after 24 hours as the peel strength of two polyethylene terephthalate films bonded together with an adhesive layer of 3 µm and a contact pressure of 3 bar.

The invention also provides a bonding process in which two substrates are bonded together by applying to the surface of at least one of the substrates a 2-component adhesive that comprises, as a reactive component, at least one of the compounds A having cyclic monothiocarbonate units described in more detail above and curing compound B.

The substrates to be bonded may be the same or different from one another and are preferably selected from metal, wood, glass, plastic shaped bodies, plastic films, paper, and paperboard.

Preferred applications and preferred bonding processes are composite film lamination, glossy film lamination, and the lamination of shaped bodies, as used particularly in furniture lamination or in the lamination of automotive interior parts, and the use as structural adhesive.

The invention also provides a lamination process for producing laminated articles selected from glossy films, composite films, and laminated shaped bodies, wherein
a) a first substrate in the form of a first film is provided,
b) a second substrate is provided, selected from paper, a second film that may be the same or different from the first film, and shaped bodies,
c) a two-component adhesive according to the invention described in more detail above is provided, and
d) the two-component adhesive is, after mixing the components, applied onto the first substrate and/or onto the second substrate, optionally being allowed to dry, and the first substrate is laminated onto the second substrate, it being possible for lamination to take place under thermal activation.

The first film is preferably selected from plastic films and aluminum films, it also being possible for the plastic films to be metalized. The lamination takes place preferably under pressure and/or at elevated temperature, in particular by thermal activation. At least one of the substrates may have been printed or metalized on the side coated with the adhesive.

The invention also provides film-laminated articles produced by the laminating process according to the invention, the film material preferably being selected from the group consisting of polyvinyl chloride, which can also include plasticizers and thermoplastic polyolefin (TPO) and combinations thereof.

The films used are in many cases plastic decorative films and may have a surface structure. This surface structure on the plastic film may be impressed, for example, before, during or after bonding.

Surface treatment of the film substrates before coating with the two-component adhesive is not absolutely necessary. However, better results can be obtained if the surfaces of the film substrates are modified prior to coating. In this case it is possible to employ customary surface treatments, for example as corona treatment to boost adhesion. The polymer film preferably has hydrophilic groups on the surface that comes into contact with the adhesive. Hydrophilic groups are e.g. oxygen-containing groups, for example OH groups or acid groups. The hydrophilic groups are preferably generated by corona treatment to boost adhesion. The corona treatment or other surface treatments are carried out to the extent required for sufficient wettability with the coating composition. Customarily, corona treatment of approximately 10 watts per square meter per minute is sufficient for this purpose. Alternatively or in addition, it is optionally also possible to use primers or tie coats between the film substrate and adhesive coating and/or shaped body substrate.

In addition, the films may have other, additional functional layers, for example barrier layers, print layers, color layers or varnish layers, or protective layers. These functional layers may be present externally, i.e. on the opposite side of the film substrate to the adhesive-coated side, or internally, between film substrate and adhesive layer.

The lamination of shaped bodies relates to the production of composite bodies by permanent bonding of large-area, flexible films to solid (three-dimensionally shaped, dimensionally stable, inflexible) shaped bodies as a substrate. The flexible films are in particular selected from polymer films and metal foils. They are bonded to the solid shaped bodies, for example shaped parts made of metal, coated metal, wood, woodbase materials, fiber materials or plastic. The shaped parts may be furniture items or furniture parts, i.e. furniture constituents or automotive interior parts.

In one embodiment, the laminated shaped bodies are film-coated furniture items. The film-coated furniture items produced according to the invention are composite bodies. To improve adhesion, the composite bodies may additionally have primer layers between the film and the adhesive layer and/or between the substrate and the adhesive layer. The films and substrates to be bonded may be pretreated with adhesion promoters. However, the already good adhesive properties of adhesives according to the invention means that the use of primers is not absolutely necessary. Furniture parts may also be shaped parts formed from synthetic or natural fibers or chips bound into a shaped part by a binding agent. The shaped parts may be of any shape. Particular preference is given to MDF panels (medium-density wood fiber panels).

In the production of film-laminated shaped parts for automobile construction, lamination is carried out on a shaped part to be fitted in an automobile. Shaped parts may also be shaped parts formed from synthetic or natural fibers or chips bound into a shaped part by a binding agent, shaped parts made of plastic, for example ABS, being particularly suitable. The shaped parts may be of any shape.

Particularly preferred films as the first substrate are polymer films. Polymer film is understood as meaning in particular flexible, flat plastics having a thickness of 0.05 millimeters to 5 millimeters, preferably 0.25 to 1 mm, that can be rolled up. Thus, in addition to "films" in the strict sense of thicknesses of less than 1 mm, this is also understood as meaning sealing membranes, such as those typically used to seal tunnels, roofs or swimming pools, having a thickness of typically 1 to 3 mm, in special cases even up to a thickness of max. 5 mm. Plastic films of this kind are usually produced by spreading, casting, extrusion or particularly preferably by calendering and are typically commercially available in rolls or else produced in situ. They may be formed as a single layer or as multiple layers. The plastic of the polymer films is preferably a thermoplastic, e.g. polyester, such as polyethylene terephthalate (PET), thermoplastic polyolefins (TPO), such as polyethylene, oriented polypropylene (OPP), unstretched polypropylene (CPP), polyvinyl chloride, in particular soft PVC, polyacetates, ethylene/vinyl acetate copolymers (EVA), ASA (acrylonitrile/styrene/acrylic ester copolymers), PUR (polyurethane), PA (polyamide), poly(meth)acrylates, polycarbonates or plastic alloys thereof, cellophane, metal-coated, e.g. aluminum-coated, (vapor-coated) polymer films (metalized films for short) or metal foils, e.g. made of aluminum. The recited films may also have been printed with printing inks for example. Particular preference is given to rigid PVC and thermoplastic polyethylene terephthalate (PET).

The films and substrates may be coated with the adhesive using customary application methods, for example by spray, spread, knife, stamp, roller or casting methods of application. Preference is given to spray application.

The amount of adhesive applied is preferably 0.5 to 100 g/m², more preferably 2 to 80 g/m², most preferably 10 to 70 g/m², based on the adhesive. Preferably, only the film or only the substrate is coated on one side. However, it is also possible to coat both units to be bonded, i.e. the film and the substrate. Coating is usually followed by drying to remove water or other solvents, preferably at room temperature or at temperatures up to 80° C.

The adhesive may be activated thermally. The temperature in the adhesive layer is preferably at least 30° C. or at least 40° C., e.g. from 30 to 200° C., or from 40 to 100° C. A particular advantage of the invention is that the adhesive can be easily activated even at temperatures below the temperature range of 60-70° C. used with conventional adhesives, e.g. at temperatures of less than 60° C., e.g. max. 58° C., max. 55° C. or max. 50° C. Bonding preferably takes place under pressure. This can be done e.g. by pressing together the parts to be bonded with a pressure of at least 0.005 or at least 0.01 or at least 0.08 N/mm², e.g. 0.005 to 5 N/mm² or 0.01 to 0.8 N/mm². The contact pressure can be generated e.g. by applying a negative pressure between the film and substrate and/or by air pressure.

The process according to the invention is also of particular importance for the production of built-in parts for vehicles. Particular preference is given to using the adhesive according to the invention for producing interior trim parts for automobiles. Examples of such interior trim parts are interior door trim, instrument panels, dashboards, parcel shelves, roof liners, sliding headliners, center consoles, glove compartments, sun visors, columns, door handles and arm rests, floor assemblies, loading floor assemblies and car boot assemblies, and also sleeping cabin walls and rear walls of delivery and goods vehicles. The sealing process therefor employs in particular a vacuum thermoforming process or press lamination. In the vacuum thermoforming process, the adhesive is applied onto the shaped body. This is then optionally flashed off, for example at room temperature or in a drying tunnel at preferably max. 40° C. Typically, the film to be bonded on, for example a decorative film made of an air-impermeable material, is hermetically clamped in a frame. Beneath the film there is a lower former onto which the shaped body is placed. The lower former and shaped body have perforations or are permeable to air. Below the equipment there is a further airtight seal. On aspirating the air from this device, the film then wraps around the shaped body snugly under the atmospheric pressure acting on its surface. The film is heated prior to application of a vacuum/negative pressure. The film is impermeable to air because of the vacuum/negative pressure to be generated. In the press lamination process, the adhesive is likewise applied on the shaped body and optionally on the film to be bonded, but at least on the shaped body. This is then optionally flashed off, typically at room temperature or in a drying tunnel at preferably max. 40° C. After thermal activation, the bonding of shaped bodies to the film can be effected by joining and pressing. The films used here are in many cases plastic decorative films and have a surface structure. This surface structure on the plastic film may be impressed, for example, before, during or after bonding.

In the lamination process according to the invention for producing composite films, the above-described two-component adhesive or a correspondingly prepared preparation is applied onto the substrates to be bonded, preferably with a layer thickness of 0.1 to 0 g/m², particularly preferably 1 to 7 g/m², e.g. by knife coating, spreading, etc. Customary coating techniques may be employed, for example roller coating, reverse roller coating, gravure roller coating, reverse gravure roller coating, brush coating, rod coating, spray coating, airbrush coating, meniscus coating, curtain coating or dip coating. After an optional short time to allow volatiles to flash off (preferably after 1 to 60 seconds) the coated film substrate may then be laminated with a second film substrate, for which the temperature may be e.g. 20° C. to 200° C., preferably 20° C. to 100° C. and the pressure e.g. 100 to 3000 kN/m², preferably 300 to 2000 kN/m². Examples of suitable substrates for composite film lamination include in particular polymer films, especially made of polyethylene (PE), oriented polypropylene (OPP), unstretched polypropylene (CPP), polyamide (PA), polyethylene terephthalate (PET), polyacetate, cellophane, metal-coated, e.g. aluminum-coated, (vapor-coated) polymer films (metalized films for short) or metal foils, e.g. made of aluminum. The recited films may be bonded to one another or to a film of another type, for example polymer films to metal foils, different polymer films to one another, etc. The recited films may also have been printed with printing inks for example.

One embodiment of the invention is a composite film obtainable by the abovementioned lamination process, i.e. produced using one of the two-component adhesives described above. The material of a first film is preferably selected from OPP, CPP, PE, PET, and PA and the material of a second film is preferably selected from OPP, CPP, PE, PET, PA, and metal foil. In one embodiment of the invention, the first film and/or the second film has been printed or metalized on the side that is being coated with the adhesive. The thickness of the substrate films may be for example from 5 to 100 µm, preferably from 5 to 40 µm. In preferred composite films, the film material is selected from the group consisting of aluminum film, printed polyester film, unprinted polyester film, printed polyamide film, unprinted polyamide film, polypropylene film, polyethylene film, and combinations thereof.

In the case of glossy film lamination, a first substrate is laminated with a second substrate, the first substrate being a polymer film, preferably a transparent polymer film, the second substrate being paper, cardboard or paperboard, the second substrate preferably being printed, with lamination preferably taking place under pressure and with heating. Lamination is carried out in analogous manner to the production of composite foils. The glossy film laminate is preferably produced using the two-component adhesive described above, the material of a transparent polymer film (first substrate) being selected from oriented polypropylene (OPP), unstretched polypropylene (CPP), polyethylene (PE), polyamide (PA), polyethylene terephthalate (PET), polyacetate, and cellophane and the material of the second substrate being selected from paper, cardboard and paperboard. The polymer film used for glossy film lamination is preferably a corona-treated OPP film. In one embodiment of the invention, the second substrate of the glossy film is colored or printed on the side that is coated with adhesive. The thickness of the substrate film may be for example from 5 to 100 µm, preferably from 5 to 40 µm.

The invention also provides for the use of the above-described curable 2-component composition for bonding in the process described in more detail above, wherein the 2-component composition
(a) in a first component comprises at least one compound A having at least one cyclic thiocarbonate unit having a five-membered ring structure in which three members of the five-membered ring have the structure —O—C(=O)—S—, the two remaining members of the five-membered ring being carbon atoms; and
(b) in a second component comprises at least one curing compound B selected from compounds having at least one functional group selected from primary amine groups and secondary amine groups, wherein the first component, the second component, and/or a further component of the adhesive may optionally comprise at least one compound C that has at least one functional group reactive toward SH groups.

The invention also provides bonded products produced according to the process described in more detail above.

The invention also provides a curable 2-component adhesive composition that
(a) in a first component comprises at least one compound A having a molecular weight greater than 1000 g/mol and having at least one cyclic thiocarbonate unit having a five-membered ring structure in which three members of the five-membered ring have the structure —O—C(=O)—S—, the two remaining members of the five-membered ring being carbon atoms; and
(b) in a second component comprises at least one curing compound B selected from compounds having at least one functional group selected from primary amine groups and secondary amine groups, wherein the at least one functional group may also be present in masked, latently reactive form; and
(c) optionally in the first component, in the second component and/or in a further component comprises at least one compound C that contains at least one functional group reactive toward SH groups, preferably at least one group having an ethylenically unsaturated bond or at least one epoxy group; in the case of compounds having epoxy groups, these are present in the first and/or in the further component of the adhesive;

wherein the curing compound B is used in an amount such that the amount $n_B$ of functional groups in curing compound B is from 80 mol % to 120 mol %, based on the amount $n_A$ of cyclic thiocarbonate groups in compound A, and wherein compound C is used in an amount such that the amount of double bonds $n_{C3}$ reactive toward SH groups is from 0 to 110 mol %, preferably from 90 to 110 mol %, based on the amount $n_A$ of cyclic thiocarbonate groups;

and wherein the adhesive composition in the not yet cured state immediately after the components have been mixed has a zero-shear viscosity at 70° C. of preferably less than 300 Pa s.

Compositions according to the invention are in particular those in which the peel strength after 24 hours of two polyethylene terephthalate films bonded together with an adhesive layer of 3 µm and with a contact pressure of 3 bar is greater than 1.5 N/15 mm.

The present invention is now elucidated in detail with reference to the examples that follow.

EXAMPLES

Measurement of Zero-Shear Viscosity

The zero-shear viscosity is the threshold value of the viscosity function at infinitely low shear rates. It is measured using an Anton Paar MCR 100 rheometer (US 200 evaluation software) in plate/plate geometry. The samples are measured under oscillatory shear at a low shear amplitude of 10%. Temperature 23° C. (or as stated), angular frequency ramp log 100-0.11/s, measuring gap 0.5 mm, evaluation according to Carreau-Gahleitner I, piston diameter 25 mm.

Structure 1

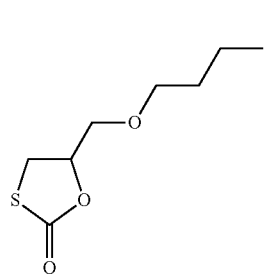

Structure 2

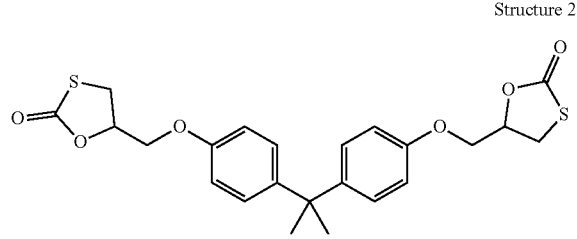

Structure 3

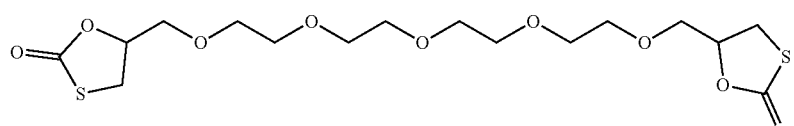

Structure 4

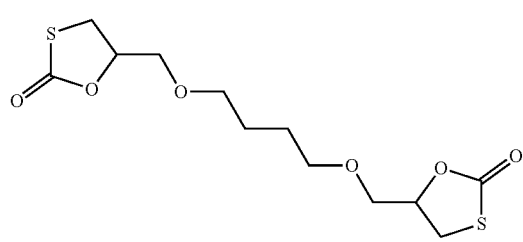

Structure 5

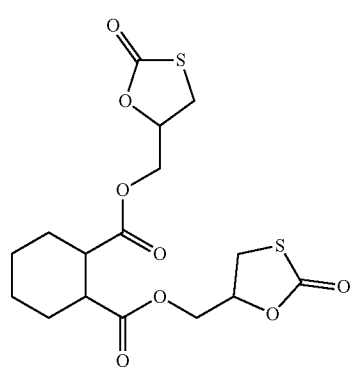

Example 1

3 g of the compound of structure 1 was mixed with 1.75 g of trimethylolpropane trimethacrylate (LaromerS TMPTMA, BASF), then 1.6 g of polyethyleneimine (LupasolS FG, BASF) was mixed in and the mixture was stirred thoroughly.

The mixture was applied on stainless steel test specimens and on aluminum test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min.

The measured tensile shear strength on stainless steel was 4.4 MPa, this being 5 MPa after 9 days at room temperature and 6 MPa after 16 days (adhesion failure in all cases).

The measured tensile shear strength on aluminum was 3 MPa after 48 h, this being 4 MPa after 9 days and after 16 days.

Application amounts in the tensile shear tests are in each case 0.2 g/(2.54 cm)$^2$.

Example 2

2 g of the compound of structure 1 was mixed with 0.6 g of the compound of structure 2 and 1.46 g of trimethylolpropane trimethacrylate (Laromer TMPTMA, BASF), then 1.31 ml of 4,9-dioxadodecane-1,12-diamine (Baxxodur® EC 280, BASF) was added by pipette.

The mixture was applied on beech wood test specimens (Rocholl GmbH) and bonded and fixed with an overlap of 2 cm×4 cm. These were cured overnight at room temperature. After 12 h, the test specimens were bonded handtight. After 48 h, a tensile shear test was carried out at 100 mm/min.

The measured tensile shear strength was 1 MPa, this being 2 MPa after 8 days at room temperature (cohesion failure in each case).

Example 3

2 g of the compound of structure 3 was mixed with 1.06 g of trimethylolpropane trimethacrylate (Laromer® TMPTMA, BASF), then 0.968 g of polyethyleneimine (Lupasol® FG, BASF) was mixed in and the mixture was stirred thoroughly.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 2.5 MPa (mixed cohesion/adhesion failure). The measured tensile shear strength after storage for 8 days at room temperature was 2.7 MPa.

Example 4

2 g of the compound of structure 3 was mixed with 1.06 g of trimethylolpropane trimethacrylate (Laromer® TMPTMA, BASF), then 0.668 g of 1,3-diaminomethylcyclohexane (TCI) was mixed in and the mixture was stirred thoroughly.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 2.1 MPa (mixed cohesion/adhesion failure). The measured tensile shear strength after storage for 8 days at room temperature was 3 MPa.

Example 5

2 g of the compound of structure 1 was mixed with 1.16 g of trimethylolpropane trimethacrylate (Laromer® TMPTMA, BASF), then 0.73 g of 1,3-bis(aminomethyl) cyclohexane (Sigma-Aldrich) was mixed in and the mixture was stirred thoroughly.

Measurement of Peel Strength at 23° C.

A spiral film applicator (Erichsen Coater) was used to immediately coat the mixture onto a PET film (Hostaphan® RN 36) (layer thickness 12 μm) and a further PET film was laminated on top of this and rolled on twice with a 2 kg roller. After 24 h at room temperature, the composite film was cut into strips 15 mm wide. The two films of the composite were clamped open at an angle of 90° in a tensile tester and the peel strength was tested at 100 mm/min. The measured peel strength was 2 N/15 mm.

A peel strength of greater than 1.5 N after 24 h is particularly suitable for applications of the adhesive in flexible packaging materials and for composite film lamination, in order to be industrially usable.

Example 6

2 g of the compound of structure 4 was mixed with 1.4 g of trimethylolpropane trimethacrylate (Laromer® TMPTMA, BASF) and thickened with 0.35 g of HDK H13L silica gel (Wacker), then 0.883 g of 1,3-diaminomethylcyclohexane (TCI) was mixed in and the mixture was stirred thoroughly.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 11.5 MPa (adhesion failure).

The mixture was also applied on aluminum test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 5 MPa (adhesion failure).

The mixture was also applied on ABS test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 2.5 MPa (adhesion failure).

Example 7

2 g of the compound of structure 5 was mixed with 1.12 g of trimethylolpropane trimethacrylate (Laromer® TMPTMA, BASF) and thickened with 0.15 g of HDK H13L silica gel (Wacker), then 1.09 g of 4,7,10-trioxa-1,13-tridecanediamine (BASF) was mixed in and the mixture was stirred thoroughly.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 5.7 MPa (adhesion failure).

The mixture was also applied on aluminum test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. A measured tensile shear strength was 3.1 MPa (adhesion failure).

The mixture was also applied on ABS test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. A measured tensile shear strength was 3.3 MPa (adhesion failure).

Example 8

1 g of the compound of structure 4 was mixed with 0.7 g of trimethylolpropane trimethacrylate (Laromer® TMPTMA, BASF) and thickened with 0.1 g of HDK H13L silica gel (Wacker), then 0.62 g of 1,4-bis(3-aminopropyl) piperazine (BASF) was mixed in and the mixture was stirred thoroughly.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 9.4 MPa (adhesion failure).

The mixture was also applied on aluminum test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 2.4 MPa (adhesion failure).

The mixture was also applied on ABS test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 2.1 MPa (adhesion failure).

Example 9

1 g of the compound of structure 4 was mixed with 1.59 g of bisphenol A glycerolate dimethacrylate (Sigma Aldrich), then 0.44 g of 1,3-diaminomethylcyclohexane (TCI) was mixed in and the mixture was stirred thoroughly.

The mixture becomes homogeneous and readily processable.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 6.4 MPa (adhesion failure). After a curing time of 48 h, further test specimens were stored for 7 days in a drying oven at 70° C. in steam in a closed vessel. After this, they were air-dried for 7 days at room temperature and a tensile shear test was carried out at 100 mm/min. The measured tensile shear strength was 2.4 MPa throughout (adhesion failure).

Example 10

1 g of the compound of structure 4 was mixed with 1.15 g of bisphenol A bis glycidyl ether (BADGE) (Sigma Aldrich)), then 0.46 g of Jeffamine EDR 148 (Huntsman) was mixed in and the mixture was stirred thoroughly.

The mixture was applied on stainless steel test specimens (Rocholl GmbH) and bonded and fixed with an overlap of 2.5 cm×2.5 cm. These were cured overnight at room temperature. After 12 h, the test specimens were bonded handtight. After 48 h, a tensile shear test was carried out at 100 mm/min. The measured tensile shear strength was 15.3 MPa (adhesion failure).

After a curing time of 48 h, further test specimens were stored for 7 days in a drying oven at 70° C. in steam in a closed vessel. After this, they were air-dried for 7 days at room temperature and a tensile shear test was carried out at 100 mm/min. The measured tensile shear strength was 5.4 MPa throughout (adhesion failure).

The invention claimed is:

1. A bonding process in which two substrates are bonded together by applying to a surface of at least one of the substrates a curable, not yet cured, liquid adhesive that
   (a) in a first component comprises at least one compound A; and
   (b) in a second component comprises at least one curing compound B selected from compounds having at least one functional group selected from primary amine groups and secondary amine groups, and wherein the first component, the second component, and/or a further component of the adhesive comprises at least one compound C that has at least one functional group reactive with an —SH group, wherein the at least one functional group has an ethylenically unsaturated bond,
   wherein the substrates being bonded are the same or different from one another and are selected from the group consisting of metal, wood, glass, plastic shaped bodies, plastic films, paper, and paperboard,
   wherein at least two of the at least one compounds A, B, and C are polyfunctional, and
   wherein the at least one compound A has the formula (I)

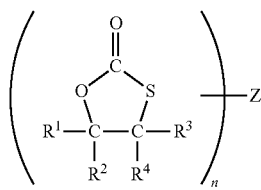

where $R^1$ to $R^4$ are independently hydrogen or an organic group having up to 50 carbon atoms; one of the groups $R^1$ to $R^4$ being a linking group to Z, n is an integer greater than or equal to 1, and Z is hydrogen or an n-valent organic group.

2. The bonding process according to claim 1, wherein three of the groups $R^1$ to $R^4$ in formula I are hydrogen and a remaining group from $R^1$ to $R^4$ is the linking group to Z.

3. The bonding process according to claim 1, wherein the linking group to Z is a single bond or an ether group —CH$_2$—O— or an ester group —CH$_2$—O—C(=O)—.

4. The bonding process according to claim 1, wherein Z is an n-valent organic group having up to 50 carbon atoms, which optionally contains oxygen atoms, and n is a number from 2 to 5.

5. The bonding process according to claim 1, wherein the at least one compound A has the formula (II)

where n is a number greater than or equal to 1, and Z is hydrogen or an n-valent organic group, in which the group Z is substituted or unsubstituted and in which the group Z is optionally interrupted by O, halogen, S, C=O, O—C=O, O—(C=O)—O or (C=O)—NR, where R is hydrogen or an organic group.

6. The bonding process according to claim 1, wherein Z is an alkoxylene group or a polyalkoxylene group of the formula G1:

where V is a C2 to C20 alkylene group and m is a number greater than or equal to 1.

7. The bonding process according to claim 1, wherein Z is a group of the formula G2:

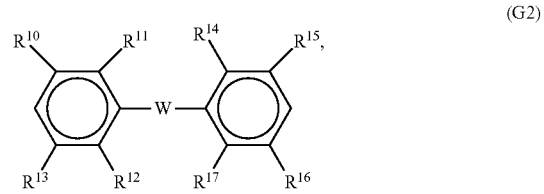

where W is a divalent organic group having up to 10 carbon atoms and $R^{10}$ to $R^{17}$ are independently H or a C1 to C4 alkyl group.

8. The bonding process according to claim 1, wherein the at least one compound A is selected from the group consisting of compounds of the formula (III)

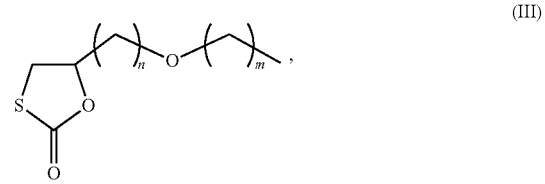

where n is a number from 1 to 10, and m is a number from 0 to 9; and compounds of the formula (IV)

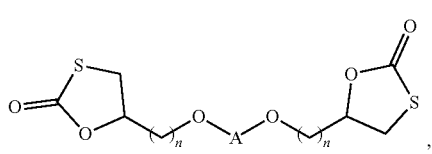
(IV)

where n is a number from 1 to 10, and A is a group selected from -Ph-CR$_a$R$_b$-Ph- and -(CH$_2$—CH$_2$—O)$_m$-CH$_2$—CH$_2$—,
where R$_a$ and R$_b$ are independently H or C1 to C4 alkyl; and m is a number from 0 to 10.

9. The bonding process according to claim 1, wherein the at least one compound B is a compound selected from polyamines having at least two primary or secondary amine groups.

10. The bonding process according to claim 1, wherein the at least one compound B is a compound having at least two primary amine groups.

11. The bonding process according to claim 1, wherein the at least one functional group reactive with an —SH group is selected from (meth)acrylic, allylic, and vinylic C—C double bonds and C—C triple bonds.

12. The bonding process according to claim 1, wherein the at least one compound C is selected from a group consisting of trimethylolpropane tri(meth)acrylate and alkanediol di(meth)acrylates of C2 to C8 alkanediols.

13. The bonding process according to claim 1, wherein the at least one curing compound B is used in an amount such that the amount n$_B$ of functional groups in the at least one curing compound B is from 80 mol % to 120 mol %, based on an amount n$_A$ of cyclic thiocarbonate groups in the at least one compound A, and that the at least one compound C is used in an amount such that the amount of functional groups n$_{C3}$ is from 90 to 120 mol %, based on the amount n$_A$ of cyclic thiocarbonate groups.

14. The bonding process according to claim 1, wherein the adhesive is applied in an applied amount from 0.5 to 1000 g/m$^2$.

15. The bonding process according to claim 1, wherein it is a lamination process for producing laminated articles selected from glossy films, composite films, and laminated shaped bodies, wherein
a) a first substrate in the form of a first film is provided,
b) a second substrate is provided, selected from paper, a second film that may be the same or different from the first film, and shaped bodies,
c) the adhesive according to claim 1 is provided, and
d) the adhesive is applied onto the first substrate and/or onto the second substrate, optionally being allowed to dry, and the first substrate is laminated onto the second substrate.

16. The bonding process according to claim 1, wherein the adhesive comprises at least one catalyst for catalyzing the reaction of the cyclic carbonate groups in the at least one compound A with the functional groups in the at least one curing compound B or wherein the adhesive comprises at least one catalyst or initiator for catalyzing or initiating a reaction of SH groups with one another or a reaction of —SH groups with ethylenically unsaturated double bonds.

17. The bonding process according to claim 1, wherein bonding takes place at temperatures of less than or equal to 30° C.

18. A bonding process according to claim 1, wherein a peel strength after 24 hours of the two substrates which comprise two polyethylene terephthalate films bonded together with an adhesive layer, formed from the curable, not yet cured, liquid adhesive, of 3 μm thickness and with a contact pressure of 3 bar, is greater than 1.5 N/15 mm.

19. The bonding process according to claim 1, wherein the functional group reactive with an SH group are selected from ethylenically unsaturated bonds, which are selected from the group consisting of (meth)acrylic, allylic, vinylic C—C double bonds, and C—C triple bonds.

20. The bonding process according to claim 1, wherein the at least one compound C is a different compound from the at least one compound A and the at least one compound C reacts with SH groups formed by the reaction of the at least one compound A and the at least one compound B.

21. A curable adhesive composition that
(a) in a first component comprises at least one compound A having a molecular weight greater than 1000 g/mol; and
(b) in a second component comprises at least one curing compound B selected from compounds having at least one functional group selected from primary amine groups and secondary amine groups,
and wherein the first component, the second component, and/or a further component of the adhesive composition comprises at least one compound C that has at least one functional group reactive with an —SH group, wherein the at least one functional group has an ethylenically unsaturated bond,
wherein at least two of the at least one compounds A, B, and C are polyfunctional, and
wherein the at least one compound A has the formula (I)

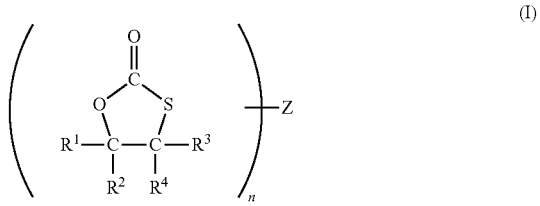
(I)

where R$^1$ to R$^4$ are independently hydrogen or an organic group having up to 50 carbon atoms; one of the groups R$^1$ to R$^4$ being a linking group to Z, n is an integer greater than or equal to 1, and Z is hydrogen or an n-valent organic group,
wherein the curing compound B is used in an amount such that the amount na of functional groups in curing compound B is from 80 mol % to 120 mol %, based on the amount n$_A$ of cyclic thiocarbonate groups in compound A, and wherein compound C is used in an amount such that the amount of double bonds nos reactive toward SH groups is from 90 to 110 mol %, based on the amount n$_A$ of cyclic thiocarbonate groups.

22. The curable adhesive composition according to claim 21, wherein the adhesive composition in a not yet cured state immediately after the components have been mixed has a zero-shear viscosity at 70° C. of less than 300 Pas.

23. The curable adhesive composition according to claim 21, wherein the adhesive composition is either a solution in an organic solvent or is solvent-free.

\* \* \* \* \*